(12) United States Patent
Li et al.

(10) Patent No.: US 8,841,994 B2
(45) Date of Patent: Sep. 23, 2014

(54) INTELLIGENT TRAFFIC SAFETY SYSTEM BASED ON COMPREHENSIVE STATE DETECTION AND DECISION METHOD THEREOF

(71) Applicant: Beijing Its-Star Technology Co., Ltd., Beijing (CN)

(72) Inventors: Minghang Li, Beijing (CN); Zhibin Li, Beijing (CN); Rose Shao, Marlborough, MA (US); Tao Ma, Beijing (CN); Zongli Lin, Charlottesville, VA (US); Bin Li, Beijing (CN); Zhengbin Yao, Beijing (CN); Jianchao Mou, Beijing (CN); Ying Li, Beijing (CN)

(73) Assignee: Beijing Its-Star Technology Co., Ltd., Beijing (CN)

( * ) Notice: Subject to any disclaimer, the term of this patent is extended or adjusted under 35 U.S.C. 154(b) by 0 days.

(21) Appl. No.: 13/674,836

(22) Filed: Nov. 12, 2012

(65) Prior Publication Data

US 2013/0069773 A1    Mar. 21, 2013

Related U.S. Application Data

(63) Continuation of application No. PCT/CN2011/074013, filed on May 12, 2011.

(30) Foreign Application Priority Data

| May 12, 2010 | (CN) | 2010 2 0187696 |
| Dec. 31, 2010 | (CN) | 2010 1 0620675 |
| Dec. 31, 2010 | (CN) | 2010 2 0696275 |
| Dec. 31, 2010 | (CN) | 2010 2 0696640 |
| May 11, 2011 | (CN) | 2011 2 0149259 |
| May 11, 2011 | (CN) | 2011 2 0149271 |
| May 12, 2011 | (CN) | 2011 1 0122062 |

(51) Int. Cl.

| B60Q 1/00 | (2006.01) |
| B60W 30/095 | (2012.01) |
| B60K 28/02 | (2006.01) |
| B60W 30/08 | (2012.01) |
| B60K 28/10 | (2006.01) |
| B60W 40/09 | (2012.01) |
| B60R 25/10 | (2013.01) |
| G06F 17/10 | (2006.01) |
| B60D 1/28 | (2006.01) |

(52) U.S. Cl.
CPC .............. B60W 40/09 (2013.01); Y02T 10/84 (2013.01); B60W 30/0956 (2013.01); B60K 28/02 (2013.01); B60W 30/08 (2013.01); B60K 28/10 (2013.01); B60W 30/0953 (2013.01)
USPC ......... 340/436; 340/426.1; 701/301; 180/271

(58) Field of Classification Search
USPC ............. 340/436, 426.1, 988, 903, 901, 902, 340/937, 942; 180/271–289, 167, 169, 170, 180/6.2, 6.32, 6.4, 6.58, 7.1; 701/1, 701/200, 207, 301
See application file for complete search history.

(56) References Cited

U.S. PATENT DOCUMENTS

| 7,395,144 B2 * | 7/2008 | Isaji et al. ............... 701/70 |
| 7,769,498 B2 * | 8/2010 | Isaji et al. ............... 701/1 |
| 8,200,407 B2 * | 6/2012 | Horiguchi et al. ........ 701/80 |

FOREIGN PATENT DOCUMENTS

| CN | 1706693 | 12/2005 |
| CN | 101407193 | 4/2009 |
| CN | 101480939 | 7/2009 |
| CN | 201325292 | 10/2009 |
| CN | 201378052 | 1/2010 |

* cited by examiner

OTHER PUBLICATIONS

International Search Report mailed Aug. 18, 2011 for PCT/CN2011/074013, citing the above reference(s).

*Primary Examiner* — Jennifer Mehmood
*Assistant Examiner* — Omar Casillashernandez

(74) *Attorney, Agent, or Firm* — Lowe Hauptman & Ham, LLP

(57) ABSTRACT

The present invention discloses an intelligent traffic safety system based on comprehensive state detection and decision method thereof. The intelligent traffic safety system includes a person condition detection unit, a vehicle condition detection unit, a road condition detection unit, an intelligent decision unit, a driver warning unit, a current vehicle mandatory processing unit, a barrier warning unit, a pursuer warning unit and an after-crash warning unit. The person condition detection unit, the vehicle condition detection unit and the road condition detection unit are separately connected to the intelligent decision unit; the intelligent decision unit implements an intelligent traffic safety decision method based on comprehensive state detection, and respectively sends corresponding crash avoidance warnings and processing instructions to the driver warning unit, the current vehicle mandatory processing unit, the barrier warning unit, the pursuer warning unit and the after-crash warning unit connected to the intelligent decision unit.

19 Claims, 14 Drawing Sheets

INTELLIGENT TRAFFIC SAFETY SYSTEM BASED ON COMPREHENSIVE STATE DETECTION AND DECISION METHOD THEREOF

CROSS REFERENCE TO RELATED APPLICATION

Related Applications

The present application is a continuation of International Application Number PCT/CN2011/074013 filed May 12, 2011, the disclosure of which is hereby incorporated by reference herein in their entirety. Further, this application claims the priority of Chinese Patent Application No. 201020187696.0, filed on May 12, 2010; Chinese Patent Application No. 201010620675.8, filed on Dec. 31, 2010; Chinese Patent Application No. 201020696640.8, filed on Dec. 31, 2010; Chinese Patent Application No. 201020696275.0, filed on Dec. 31, 2010; Chinese Patent Application No. 201120149271.5, filed on May 11, 2011; Chinese Patent Application No. 201120149259.4, filed on May 11, 2011; and Chinese Patent Application No. 201110122062.6, filed on May 12, 2011 in the SIPO (State Intellectual Property Office of the P.R.C), the disclosure of which are incorporated herein in their entirety by reference.

FIELD OF THE INVENTION

The present invention relates to an intelligent traffic safety system and a decision method thereof, and in particular, to an intelligent traffic safety system and decision method thereof, which integrates person condition detection, road condition detection and vehicle condition detection and implements vehicle crash avoidance warning and processing based on comprehensive state detection, belonging to the field of traffic safety technologies.

BACKGROUND OF THE INVENTION

In the global world, the number of motor vehicles is growing rapidly, and currently the vehicle ownership is over two hundred million. At the same time, the traffic safety problem is increasingly prominent. Relevant statistics show that most traffic accidents are crash accidents, and more than 80% crashes involve two or more vehicles. Therefore, how to avoid and reduce vehicle crash accidents becomes a primary and urgent problem to be solved in the field of traffic safety.

Causes of all vehicle crashes can be classified into three aspects: the person condition, such as drunk driving or fatigue driving; vehicle condition, such as brake failure or braking too late; and the road condition, such as a sharp turn or an abrupt slope in front which the vehicle fails to dodge in time and traffic jam that causes rear-end collisions. All solutions developed in the current anti-crash technologies are directed to a part of the foregoing causes, and no technical solution that performs comprehensive detection with respect to all the three causes to implement vehicle crash avoidance warning and processing is available.

After intensive research, the inventors hold the opinion that, only knowing the relative movement condition between a vehicle and ambient objects (or called road condition) is far from enough because, in the same road condition, a driver with a strong reaction capability can avoid a crash, while a driver with a weak reaction may fail to do so, and different fatigue and alertness levels of the same driver at different moments also lead to different disposal capabilities. Even if the road conditions are the same, and reaction and disposal capabilities of drivers are also completely the same, a vehicle with good performance may avoid a crash accident, while a vehicle with relatively poor performance may be incapable of avoiding a crash accident. In the existing disclosed technologies, the person condition, the road condition, and the vehicle condition are not comprehensively considered, and therefore the universal intrinsic mechanism of various vehicle crash phenomena cannot be discovered. The existing technologies are palliatives, and it is impossible to fundamentally prevent occurrence of a crash accident.

SUMMARY OF THE INVENTION

The paramount technical problem to be solved by the present invention is to provide an intelligent traffic safety system based on comprehensive state detection. The system comprehensively considers induction mechanisms of crash accident caused by a person condition, a road condition and a vehicle condition, and implements intelligent and scientific decision on crash avoidance and prediction on the basis of comprehensive state detection.

Another technical problem to be solved by the present invention is to provide an intelligent traffic safety decision method based on comprehensive state detection. The decision method explores the universal intrinsic law of various vehicle crash phenomena, teases out an intelligent and scientific decision principle for crash avoidance and prediction, and proposes a practical solution for crash avoidance warning and processing.

In order to achieve the foregoing invention objective, the present invention adopts the following technical solutions.

An intelligent traffic safety decision method based on comprehensive state detection is provided, wherein Before a vehicle makes an action decision, a requirement for avoiding a crash between the vehicle and a front single-target barrier is considered, and if no intervention is applied, a crash occurs after the time expressed as follows:

$$t_{relative} = \frac{r_{relative}}{v_{relative}}$$

An influence of a person condition is considered, in which the most basic requirement for avoiding a crash is to satisfy the following non-intervention crash incurrence time constraint criterion:

$$t_{relative} > t_{dr}$$

Further, an influence of a vehicle condition is considered, in which the most basic requirement for avoiding a crash is expressed as follows:

$$a_{relative} = \frac{v_{relative}}{t_{relative}} = \frac{v_{relative}^2}{r_{relative}} < a_{brake}$$

Further, an influence of a road condition is considered, in which the most basic requirement for avoiding a crash is to satisfy the following intervention acceleration constraint criterion:

$$\frac{v_{relative}^2}{r_{relative}} < k_{gradient} k_{crooked} a_{brake}.$$

Where, $r_{relative}$ is a relative distance reference value, $v_{relative}$ is a relative speed reference value, $k_{gradient}$ is a gradient influencing coefficient, and $k_{crooked}$ is a camber influencing coefficient.

An intelligent traffic safety system based on comprehensive state detection is also provided.

The intelligent traffic safety system includes a person condition detection unit, a vehicle condition detection unit, a road condition detection unit, an intelligent decision unit, a driver warning unit, a current vehicle mandatory processing unit, a barrier warning unit, a pursuer warning unit and an after-crash warning unit, wherein, the person condition detection unit further includes three underlying detection modules for driver identity recognition and basic capability detection, driver's alcoholic strength monitoring, and driver's fatigue degree detection;

the vehicle condition detection unit further includes five underlying detection modules for vehicle basic parameter detection, vehicle dynamic parameter detection, gear position setting parameter detection, deceleration and braking parameter detection, and acceleration and starting parameter detection;

the road condition detection unit further includes six underlying detection modules for road basic parameter detection, weather influencing factor detection, road busy degree detection, front barrier detection, rear pursuer detection, and opposite pursuer detection;

the person condition detection unit, the vehicle condition detection unit and the road condition detection unit are separately connected to the intelligent decision unit; the intelligent decision unit executes an intelligent traffic safety decision method based on comprehensive state detection, and separately sends corresponding crash avoidance warning and processing instructions to the driver warning unit, the current vehicle mandatory processing unit, the barrier warning unit, the pursuer warning unit and the after-crash warning unit connected to the intelligent decision unit according to person condition information, vehicle condition information and road condition information.

Compared with the prior art, the present invention comprehensively considers induction mechanisms of crash accident caused by person condition information, road condition information and vehicle condition information, teases out an intelligent and scientific decision principle for crash avoidance prediction through analyzing the universal intrinsic law of various vehicle crash phenomena, and proposes a practical solution for crash avoidance warning and processing.

BRIEF DESCRIPTION OF THE DRAWINGS

The present disclosure will become more fully understood from the detailed description given herein below for illustration only, and thus are not limitative of the present disclosure, and in which.

DETAILED DESCRIPTION OF THE PREFERRED EMBODIMENTS

In the present invention, person condition information includes information about driver fatigue state, driver under-threat state, driver drinking state, and whether a driver is a legitimate driver. Recognition of the person condition information is implemented by various vehicle-mounted electronic terminals mounted on a vehicle. Road condition information refers to information about a maintenance state and an unblocked degree of a road, and a weather situation issued by roadside infrastructures to a vehicle on a section of the road, and information about the longitude, the latitude, and the vacancy of a nearby parking lot issued by a facility at the entrance of the parking lot to the vehicle. Vehicle condition information is directly collected by a vehicle-mounted electronic terminal, such as information about the vehicle running speed, the vehicle overtaking request, the vehicle parking request, the geographic coordinate of the vehicle, the vehicle in distress, the vehicle model, and the license plate number, and the information is indirectly from an operation of a driver.

Compared with the prior art, the present invention has a notable feature of comprehensively considering induction mechanisms of person condition information, road condition information and vehicle condition information on a crash accident, teasing out an intelligent and scientific decision principle for crash avoidance prediction through analyzing the universal intrinsic law of various vehicle crash phenomena, and proposing a practical solution for crash avoidance warning and processing. Accordingly, an intelligent traffic safety system based on comprehensive state detection provided in the present invention uses a design solution shown in FIG. 1.

Figure 1:
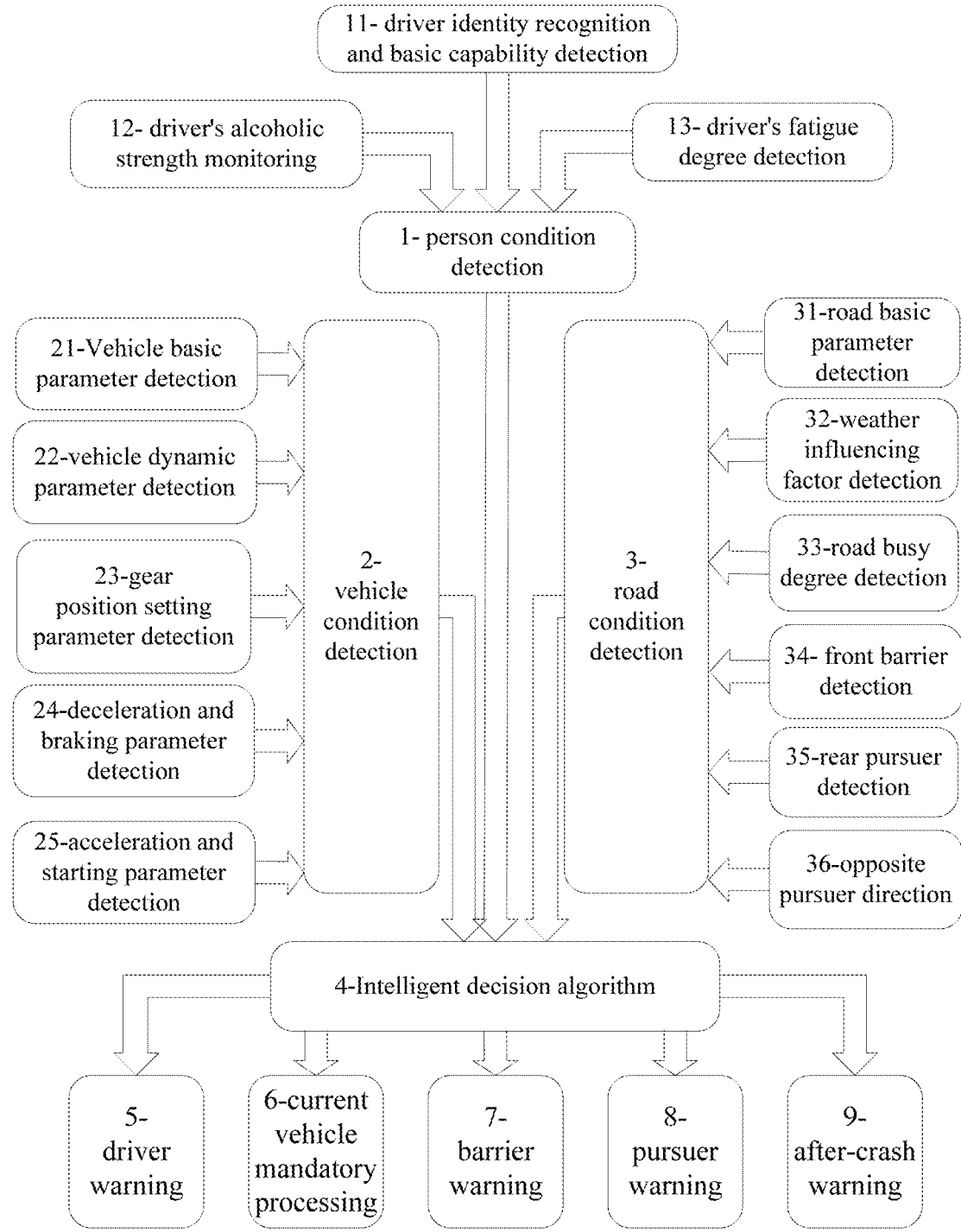
FIG. 1 is an overall schematic architectural diagram of an intelligent traffic safety system provided in the present invention.

As shown in FIG. 1, the intelligent traffic safety system provided in the present invention includes a person condition detection unit 1, a vehicle condition detection unit 2, a road condition detection unit 3, an intelligent decision unit 4, a driver warning unit 5, a current vehicle mandatory processing unit 6, a barrier warning unit 7, a pursuer warning unit 8 and an after-crash warning unit 9. The person condition detection unit 1 further includes three underlying detection modules of driver identity recognition and basic capability detection 11, driver's alcoholic strength monitoring 12, and driver's fatigue degree detection 13. The vehicle condition detection unit 2 further includes five underlying detection modules of vehicle basic parameter detection 21, vehicle dynamic parameter detection 22, gear position setting parameter detection 23, deceleration and braking parameter detection 24, and acceleration and starting parameter detection 25. The road condition detection unit 3 further includes six underlying detection modules of road basic parameter detection 31, weather influencing factor detection 32, road busy degree detection 33, front barrier detection 34, rear pursuer detection 35, and opposite pursuer direction 36. The person condition detection unit 1, the vehicle condition detection unit 2 and the road condition detection unit 3 are separately connected to the intelligent decision unit 4, and input the collected person condition information, vehicle condition information and road condition information to the intelligent decision unit 4. The intelligent decision unit 4 executes an intelligent traffic safety decision algorithm based on comprehensive state detection, and separately sends corresponding crash avoidance warning and processing instructions to the driver warning unit 5, the current vehicle mandatory processing unit 6, the barrier warning unit 7, the pursuer warning unit 8 and the after-crash warning unit 9 connected to the intelligent decision unit 4.

Figure 2:
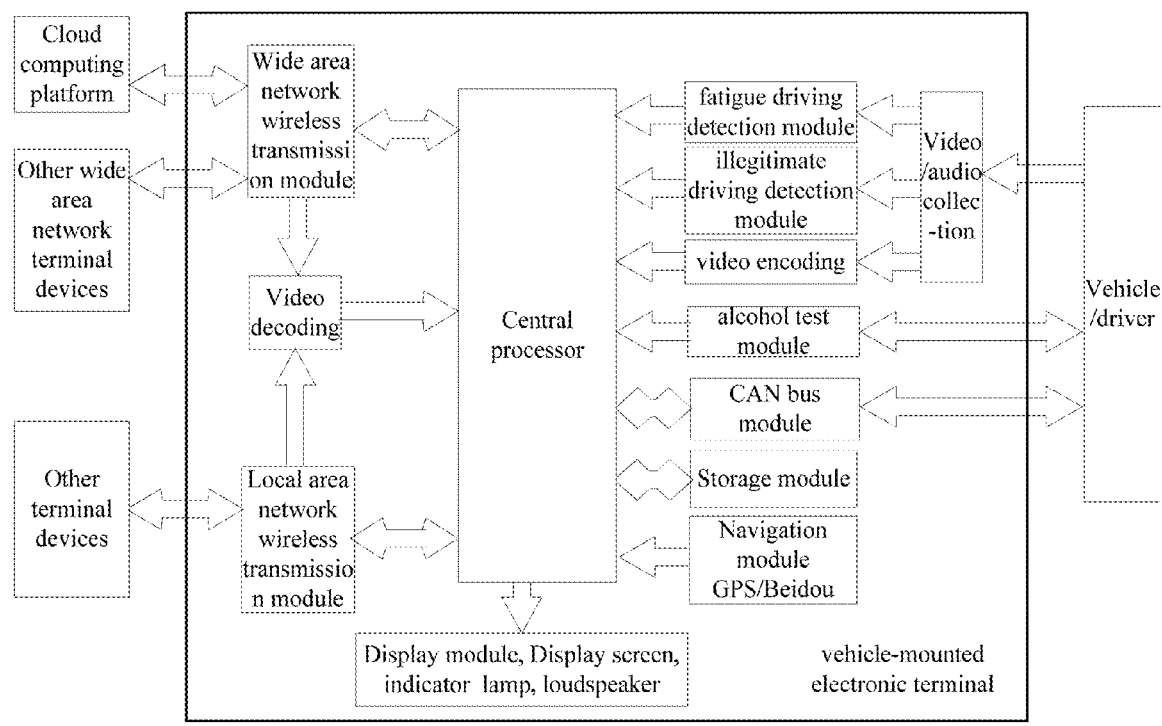
FIG. 2 is an overall schematic architectural diagram of a vehicle-mounted electronic terminal in the intelligent traffic safety system.

FIG. 2 is a schematic architectural diagram of a vehicle-mounted electronic terminal for implementing the present invention. In the vehicle-mounted electronic terminal, a TI DaVinci processor or another embedded processor may be used as a central processor, so as to satisfy requirements for video encoding/decoding, video collection, and algorithm processing. The central processor accesses a cloud computing platform through a wide area network wireless transmission module, and communicates with other wide area network terminal devices. A video/audio collection module collects person condition information of a driver, and separately feeds the person condition information to a fatigue driving detection module and an illegal driving detection module connected to the central processor to perform further analysis and judgment. An alcohol test module directly collects a breathing signal of the driver, judges whether the driver has drunk, and directly feeds a detection result to the central processor. Moreover, a local area network wireless transmission module, a display module, a storage module and a navigation positioning module (GPS/Beidou-2) are further provided in the vehicle-mounted electronic terminal. The modules are separately connected to the central processor, and are not illustrated in detail herein.

It should be noted that, the overall architecture of the vehicle-mounted electronic terminal shown in FIG. 2 is only a schematic design, it can be changed in the practical application. For example, the wide area network wireless transmission module for vehicle-mounted electronic terminals can be insteaded by mobile phone in car, and the mobile phone can communicate with the vehicle-mounted electronic terminals through a secure Bluetooth protocol, in order to make full use of resources and save cost. For requirements for collecting and recognizing different person condition information, different specific implementation manners are provided for the vehicle-mounted electronic terminal. Detailed illustration is made separately below.

First, the specific structure and the working principle of the person condition detection unit 1 in the intelligent traffic safety system are illustrated. In the present invention, person condition detection refers to detection on capabilities of a driver, which is indicated by time $t_{dr0}$ (seconds): which is from the moment when the driver obtains a crash warning to the moment when the driver completes manipulation disposal. Here, capabilities of a person mainly include two aspects: the first aspect is whether the feeling is correct and whether the mind is clear, which is indicated by a reaction capability; the second aspect is whether limbs are agile, which is indicated by a disposal capability. According to features of manipulation of a driver on a vehicle, the person condition detection unit 1 is specifically divided into three underlying detection modules: driver identity recognition and basic capability detection 11, driver's alcoholic strength detection 12 and driver's fatigue degree detection 13.

In the driver identity recognition and basic capability detection 11, $t_{dr0}$(=reaction capability $t_{re}$+manipulation capability $t_{ex}$) reflecting a reaction capability of a driver can be preset through a test when the driver registers, and can be dynamically learned, evaluated and updated according to specific later performance of the driver manipulating the vehicle.

Manners of presetting a test are diverse. For example, the reaction capability can be judged according to a driver's answers to random questions from a question bank of basic common senses and feelings on colors and sounds; the manipulation disposal capability can be actually tested through gear shifting and steering according to instructions, which specifically includes three grades, namely, strong, intermediate, and weak, based on ($t_{re-}$, $t_{re0}$, $t_{re+}$) and ($t_{ex-}$, $t_{ex0}$, $t_{ex+}$); the weaker the capability is, the larger the value is. For example, if the reaction capability is ordinary, and the disposal capability is strong, then:

$$t_{dr0}=t_{re}+t_{ex}=t_{re0}+t_{ex-} \quad (1)$$

Manners for dynamic learning, evaluating and updating are also diverse. For example, under the same rank of road condition, when the fuel consumption of unit time is higher than the rated fuel consumption of the vehicle by a certain extent, $t_{re}$, $t_{ex}$ of the driver are appropriately increased, thereby increasing the value of $t_{dr0}$. Similarly, the actual starting, braking and gear shifting capabilities may also be compared with rated starting, braking and gear shifting parameters. Specifically, comparison can be performed according to relevant parameters of the vehicle condition detection unit 2.

Figure 3:
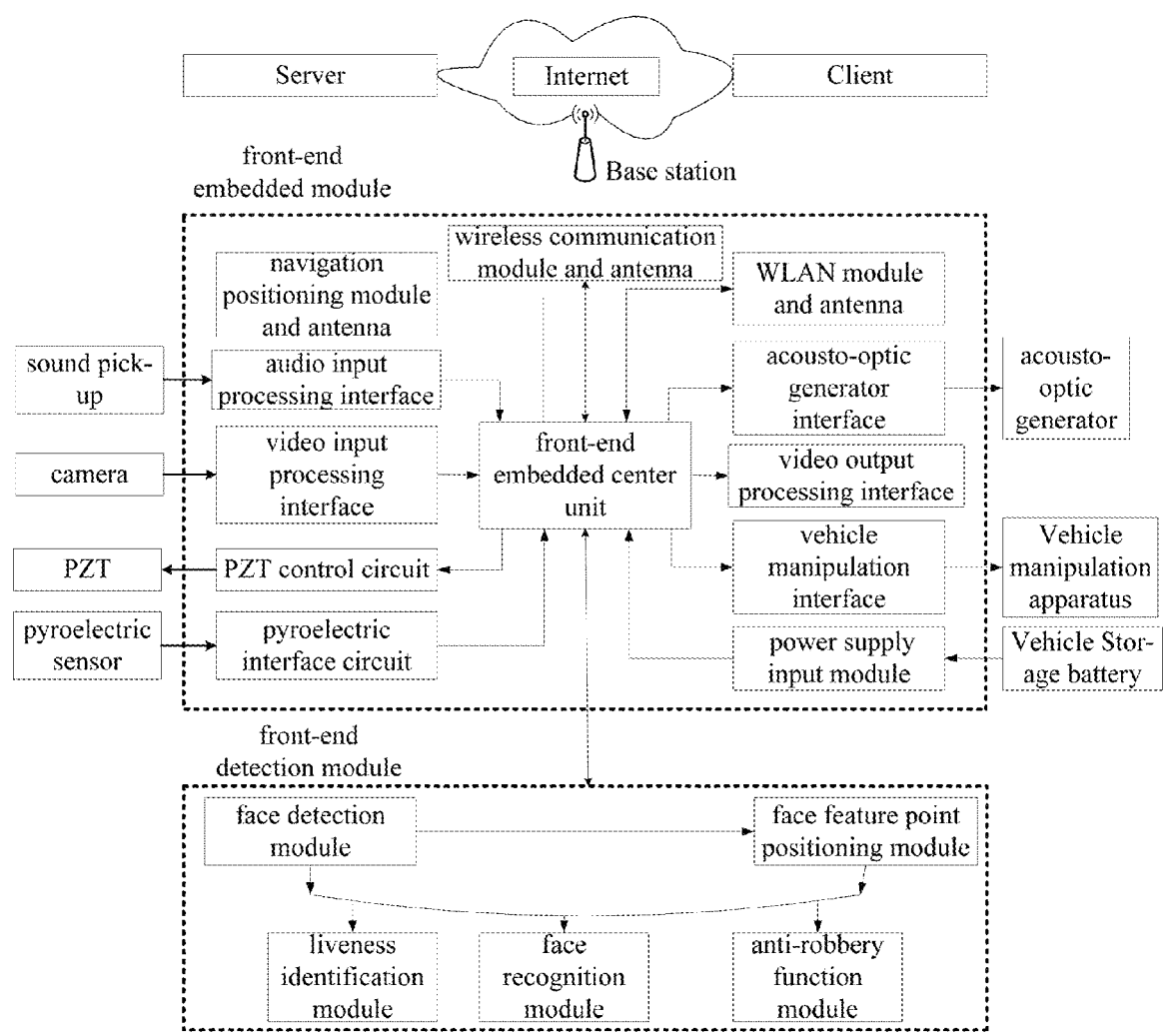
FIG. 3 is a schematic diagram of a formation principle of a vehicle anti-theft and anti-robbery network apparatus for driver identity recognition.

In the present invention, the driver identity recognition is implemented through the vehicle anti-theft and anti-robbery network apparatus shown in FIG. 3. Specifically, the vehicle anti-theft and anti-robbery network apparatus is formed of the following several parts: a pyroelectric sensor, a Pan/Tilt/Zoom (PZT), a camera, a sound pick-up, an acousto-optic generator, a front-end embedded module and a front-end detection module. The front-end embedded central unit serves as a center of the front-end embedded module, and the front-end embedded module further includes a power supply input module, a pyroelectric interface circuit, a cloud platform control circuit, a video input processing interface, an audio input processing interface, a video output processing interface, an acousto-optic generator interface, a vehicle manipulation interface, a wireless communication module and an antenna, a navigation positioning module and an antenna, and a WLAN module and an antenna. The front-end embedded central unit is separately connected to the power supply input module, the pyroelectric interface circuit, the cloud platform control circuit, the video input processing interface, the audio input processing interface, the video output processing interface, the acousto-optic generator interface, the vehicle manipulation interface, the wireless communication module and the antenna, the navigation positioning module and the antenna, and the WLAN module and the antenna; meanwhile, the front-end embedded central unit is further connected to the front-end detection module. The front-end detection module is used for executing a pattern recognition method for recognizing driver identity information such as face.

The front-end embedded central unit includes processor hardware as well as a corresponding driver program, and operating system software. The front-end embedded central unit is mounted at an appropriate position in the vehicle, may be implemented using an ARM series chip, an FPGA, a DSP or a single-chip microcomputer, and has a built-in clock. The cloud platform control circuit is used for providing cloud platform movement and camera lens zooming drive commands, so as to ensure a sufficiently large and complete driver head video image. The vehicle manipulation interface is connected to a manipulation apparatus of the vehicle, and is used for manipulating the brake and horn of the vehicle. The output of a vehicle storage battery is directly connected to the power supply input interface, and supplies power for a relevant device in the vehicle anti-theft and anti-robbery network apparatus. The wireless communication module and the antenna are used for implementing wide area network wireless communication, such as a GSM/GPRS/3G/4G communication module and a corresponding SIM/USIM card. The navigation positioning module and the antenna support receiving of information from satellites such as US GPS, Russia GNNS, European Galileo, and China Beidou-2 or support an inertial navigation system to perform navigation positioning, so as to learn the longitude and the latitude of the vehicle in real time, so that when the vehicle asks for help, a preset client is informed of the specific position through a server. The WLAN module and the antenna are used for implementing local area network wireless communication. When multiple vehicles are mounted with the vehicle anti-theft and anti-robbery network apparatus, communication between vehicles may be implemented. When the road network infrastructure is also mounted with a corresponding function module of the vehicle anti-theft and anti-robbery network apparatus, direct communication between a vehicle and a road may be implemented. When a driver in a vehicle is hijacked, the vehicle can automatically send a signal to an adjacent vehicle so as to give an alarm or ask for help.

Figure 4:
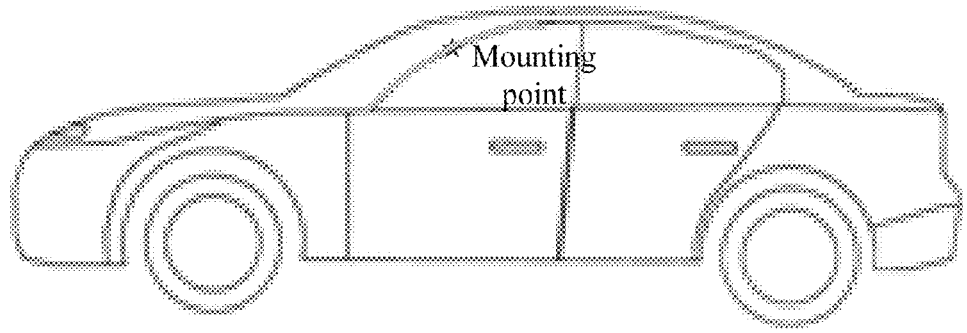
FIG. 4 is a schematic diagram of a mounting point of a component in a vehicle anti-theft and anti-robbery network apparatus, such as the mounting point of a camera.

As shown in FIG. 4, a pyroelectric sensor, a camera, a cloud platform and a sound pick-up are mounted on a frame of a vehicle front windshield outside the driver, ensuring that the sight of the driver is not affected and the mounting position is as high as the driver's head.

The pyroelectric interface circuit is connected to the pyroelectric sensor. When a driver's seat is vacant, the pyroelectric sensor keeps working, and the entire vehicle anti-theft and anti-robbery network apparatus is in a dormant state. Once someone sits at the driver's seat, the pyroelectric sensor is capable of detecting a human body pyroelectric infrared signal at the driver's seat at immediately, and the vehicle anti-theft and anti-robbery network apparatus automatically recovers a normal working state from the dormant state.

The Pan/Tilt/Zoom control circuit is connected to the Pan/Tilt/Zoom, and the video input processing interface is connected to the camera. They are responsible for transmitting a video image of the driver's head to the front-end embedded module. The front-end embedded module provides Pan/Tilt/Zoom movement and camera lens zooming drive commands, so as to ensure a sufficiently large and complete driver head video image. If natural light can ensure imaging requirements, an infrared lamp is turned off; otherwise, the infrared lamp is turned on. If the vehicle runs into a robbery during normal running, an abnormal expression naturally appears on the driver's face is transmitted to the front-end embedded module through the camera, and the front-end embedded module accesses the wireless network through the wireless communication module and the antenna, and gives an alarm to the server and a nearby vehicle mounted with an anti-theft and anti-robbery network apparatus of the same kind.

The audio input processing interface is connected to the sound pick-up. If the vehicle runs into a robbery during normal running, the abnormal sound naturally generated by the driver is transmitted to the front-end embedded module through the sound pick-up, and the front-end embedded module accesses the wireless network through the wireless communication module and the antenna, and gives an alarm to the server and a nearby vehicle mounted with a vehicle anti-theft and anti-robbery network apparatus of the same kind.

The acousto-optic generator interface is connected to the acousto-optic generator. The acousto-optic generator includes a sound generator, a lamp (which may emit red light, orange light, yellow light, green light, or other light of other colors) or a video display.

As shown in FIG. 3, the front-end detection module in the vehicle anti-theft and anti-robbery network apparatus further includes a face detection module, a face feature point positioning module, a liveness identification module, a face recognition module and an anti-robbery function module. The face detection module and the face feature point positioning module are connected, and the two function modules are separately connected to the liveness identification module, the face recognition module and the anti-robbery function module. The face detection module is used for finding the position of the face in the image based on data of an input single frame image, and indicating the position of the face using a rectangular frame. The face feature point positioning module is used for obtaining the positions of the five sense organs of the face based on the data of the input single frame image, and indicating the positions of the five sense organs using a coordinate sequence of multiple points. The liveness identification module distinguishes whether a photo of the login person is taken based on the data of the input single frame image, and on this account, judges whether to continue performing face recognition or reject photo login. The face recognition module compares a registered face image in a face bank and the data of the input single frame image, permits a registered face in the bank, and rejects a face not registered in the bank. The foregoing function modules are implemented based on an existing pattern recognition method in a software or firmware manner. For example, a face recognition method based on LGBP, a Gabor features selection and judgment analysis method based on AdaBoost, a Kernel judgment analysis method based on SV and a face recognition method based on face-specific subspace are not described in detail herein.

Figure 5:
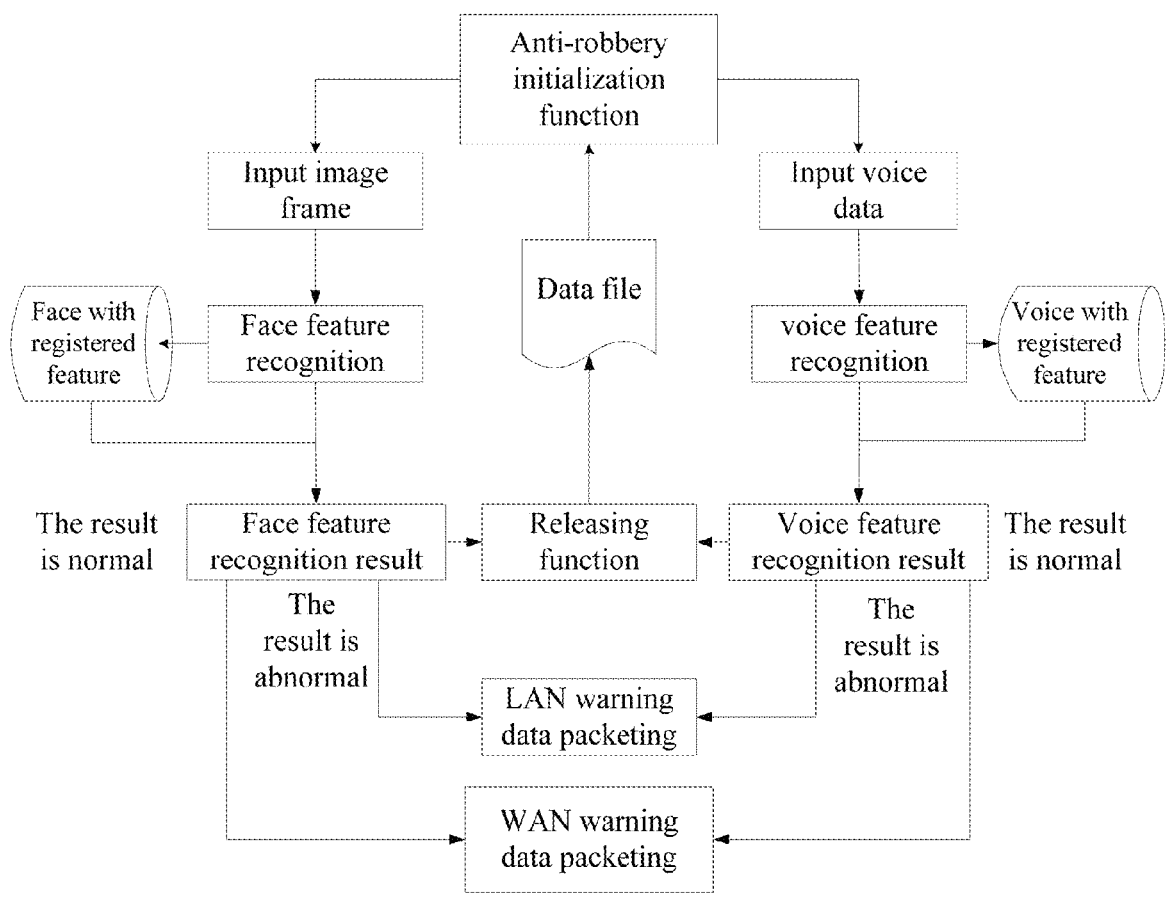
FIG. 5 is a schematic diagram of a working mode of an anti-robbery function module in a vehicle anti-theft and anti-robbery network apparatus.

FIG. 5 shows a specific working mode of the anti-robbery function module. The camera and the sound pick-up respectively input the collected driver image and sound data into the front-end detection module. The face detection module and the face feature point positioning module respectively perform image positioning and feature identification on the input image frame, and the face recognition module performs face feature comparison, thereby generating a face feature recognition result. Likewise, a built-in voice recognition sub-module (not shown in FIG. 5) in the anti-robbery function module performs corresponding recognition and judgment on the voice data input by the sound pick-up. If the result is normal, the driver is allowed to manipulate the vehicle; if the result is abnormal, the vehicle manipulation apparatus is controlled through the vehicle manipulation interface, so that the vehicle cannot normally start and run, and meanwhile, the anti-robbery function module performs network warning in through LAN and WAN.

With the foregoing vehicle anti-theft and anti-robbery network apparatus, when someone sits on the driver's seat, the system will automatically start. When the legitimate driver is away from the vehicle, and an illegitimate person sits on the driver's seat, the vehicle anti-theft and anti-robbery network apparatus finds out the illegitimate identity of the person through detection. If the driver identity is illegitimate, the vehicle cannot be started, and the horn in the vehicle gives an alarm. Meanwhile, a remote client (including a mobile phone of the legitimate driver) will obtain the alarm indicating that the vehicle is burglarized, a nearby vehicle mounted with an anti-theft and anti-robbery network apparatus of the same kind as that of the current vehicle will also obtain the alarm indicating that the vehicle is burglarized, and report the vehicle feature information and the geographic position. If the legitimate driver is robbed by a criminal during normal driving, the anti-robbery function module will make correctly determines that the robbery occurs according to abnormal facial expression and sound naturally made by the driver. When deeming that the vehicle runs into a robbery, the anti-robbery function module gives an alarm to a remote client in time to indicate that the vehicle is robbed, meanwhile gives an alarm to a nearby vehicle mounted with an anti-theft and anti-robbery network apparatus of the same kind as that of the current vehicle, to indicate that the vehicle is robbed, and reports the vehicle feature information and the geographic position.

Figure 6:
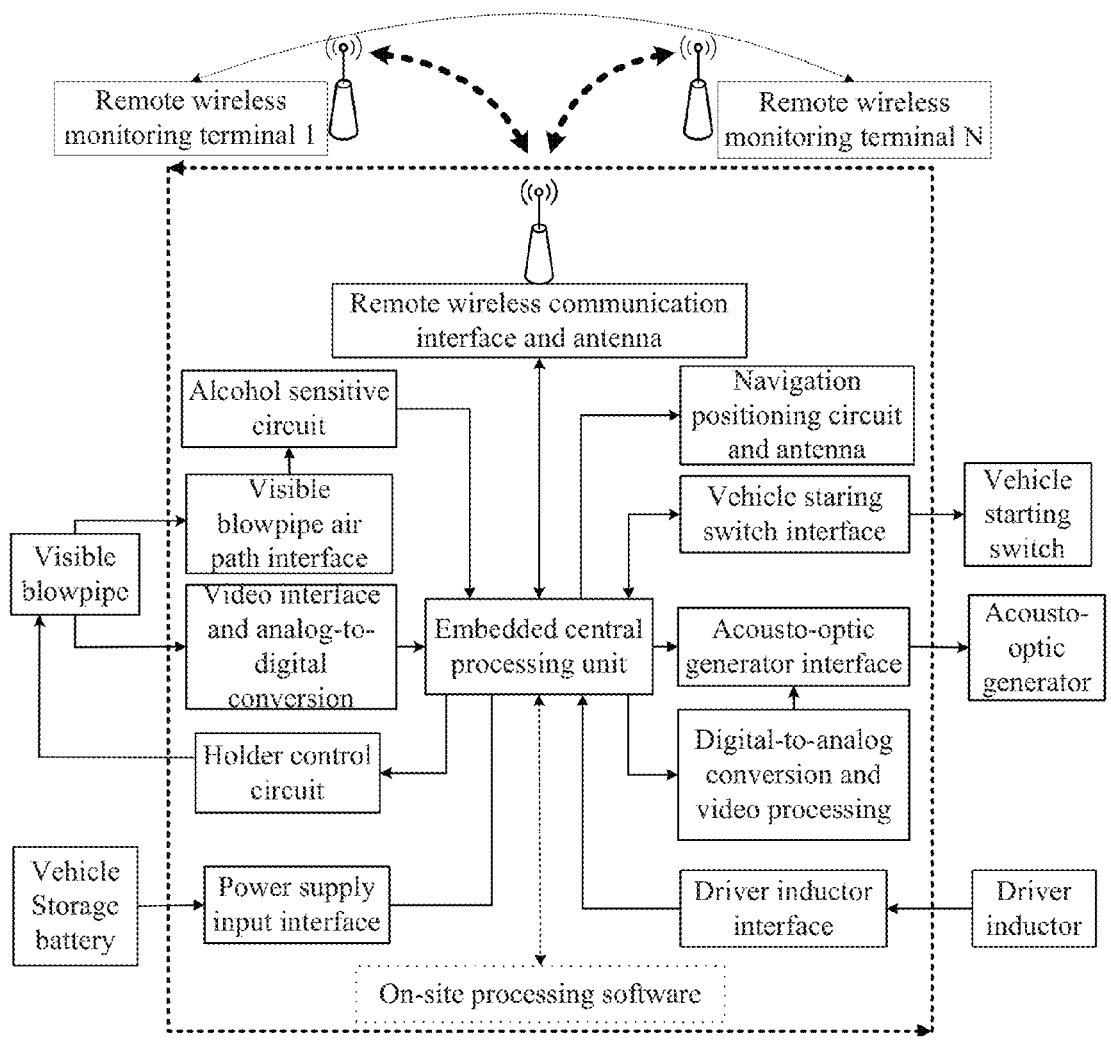
FIG. 6 is a schematic diagram of a formation principle of an electronic terminal used for implementing an alcoholic strength monitoring function.

High alcohol content in the body leads to an unclear mind of the driver and an apparent decrease of the reaction capability, and meanwhile also indirectly affects the manipulation disposal capability, so the intelligent traffic safety system performs a corresponding test through the driver's alcoholic strength detection 12. FIG. 6 is a schematic diagram of a formation principle of an electronic terminal used for implementing an alcoholic strength monitoring function. The electronic terminal includes a driver inductor, a visible blowpipe, an acousto-optic generator, an on-site embedded server and at least one remote wireless monitoring terminal. The on-site embedded server serves as the center of the electronic terminal. The driver inductor, the visible blowpipe and the acousto-optic generator are separately connected to the on-site embedded server. A remote wireless communication interface and a corresponding antenna are disposed in the on-site embedded server, so as to perform remote wireless communication with the remote wireless monitoring terminal.

The driver inductor is mounted under a driver's seat in a vehicle, and specifically may be implemented by a weightometer. When the driver sits on the driver's seat, the weight borne on the seat is apparently increased, and therefore the driver inductor senses the increase and sends the information about the increase to the on-site embedded server through a communication line.

The visible blowpipe is formed of a blowpipe, a Pan/Tilt/Zoom and a camera. The acousto-optic generator includes a sound generator, a lamp (which may emit red light, yellow light, and green light) or a video display (namely, liquid crystal display screen). The circuit connection relationship between them is well known by persons of ordinary skill in the field of electronic technologies, and is not described in detail herein.

The on-site embedded server is formed of a hardware part and corresponding on-site processing software. An embedded central processing unit serves as the center of the hardware part, and the rest parts such as a power supply input interface, a driver inductor interface, a Pan/Tilt/Zoom control circuit, a video interface and analog-to-digital conversion circuit, a visible blowpipe air path interface, an alcohol sensitive circuit, a digital-to-analog conversion and video processing circuit, an acousto-optic generator interface, a vehicle starting switch interface, a navigation positioning circuit and an antenna, and a remote wireless communication interface and an antenna are separately connected to the embedded central processing unit.

After the driver blows the air in the mouth to the visible blowpipe air path interface as required, the alcohol sensitive circuit performs processing, including signal amplification, and conversion of an analog signal into a digital signal, based on the foregoing alcoholic strength detection manner.

In the on-site processing software, a criterion (which generally cannot be modified) is preset according to the alcoholic strength index corresponding to the intoxicated drinking. A slight drinking criterion is also preset according to experiences, but can be modified within a certain range (the upper limit cannot be modified). When the result judged and detected by the on-site processing software indicates non-drinking, the acousto-optic generator will be driven through the digital-to-analog conversion and video processing circuit and the acousto-optic generator interface to report the result (if no liquid crystal display is configured, the indicator lamp is continuously on and emit green light), and the driver is allowed to normally operate the vehicle starting switch through the vehicle starting switch interface. If the result judged and detected by the on-site processing software indicates slight drinking, the acousto-optic generator will be driven through the digital-to-analog conversion and video processing circuit and the acousto-optic generator interface to report the result (if no liquid crystal display is configured, the indicator lamp is continuously on and emit yellow light), the driver is also allowed to normally operate the vehicle starting switch through the vehicle starting switch interface, but it is reported to the remote wireless monitoring terminal through the remote wireless communication interface and the antenna that the driver is in the slight drinking state, and meanwhile the vehicle real-time position obtained by the navigation positioning circuit and the antenna is also reported to the remote wireless monitoring terminal. If the result judged and detected by the on-site processing software indicates intoxicated drinking, the acousto-optic generator will be driven through the digital-to-analog conversion and video processing circuit and the acousto-optic generator interface to report the result (if no liquid crystal display is configured, the indicator lamp is continuously on and emits red light), the driver is not allowed to normally operate the vehicle starting switch through the vehicle starting switch interface; at the same time, it is reported to the remote wireless monitoring terminal through the remote wireless communication interface and the antenna that the driver is in the intoxicated drinking state, and the vehicle real-time position obtained by the navigation positioning circuit and the antenna is also reported to the remote wireless monitoring terminal.

The remote wireless monitoring terminal may perform data, sound and video communication with the remote wireless communication interface and the antenna. In this way, during vehicle operation, the on-site embedded server can require selective examination on the driver's alcoholic strength at regular time (the interval can be set to, for example, once an hour during night running), and the remote monitoring terminal can also selectively examine the driver's alcoholic strength at any time. When it is found that the driver is actually in the excessive drinking state, mandatory flame-out can be performed.

In the present invention, the driver's alcoholic strength is divided into intoxicated drinking, slight drinking, and non-drinking. When the driver's alcoholic strength reaches intoxicated drinking, the driver is in a disability state. Otherwise, the driver's capability can be dynamically updated according to the current alcoholic strength detection value of the driver based on the following formula:

$$t_{dr}=t_{re}(1+k_{alcoholicity\_re})+t_{ex\_}(1+k_{alcoholicity\_ex}). \quad (2)$$

where coefficients in brackets separately indicate influences of the alcoholic strength on the reaction capability and the manipulation capability.

The fatigue mainly leads to decrease of the driver's manipulation disposal capability, and meanwhile also indirectly leads to blunt feeling on sound and color and slow mind reaction. Relevant statistics show that, as traffic accidents caused by fatigue/doze account for about 10% of total traffic accidents, account for 45% of serious traffic accidents, and account for about 40% of traffic accidents of heavy trucks and on highways. For this reason, the driver's fatigue degree detection 13 is specially disposed in the intelligent traffic safety system.

Figure 7:
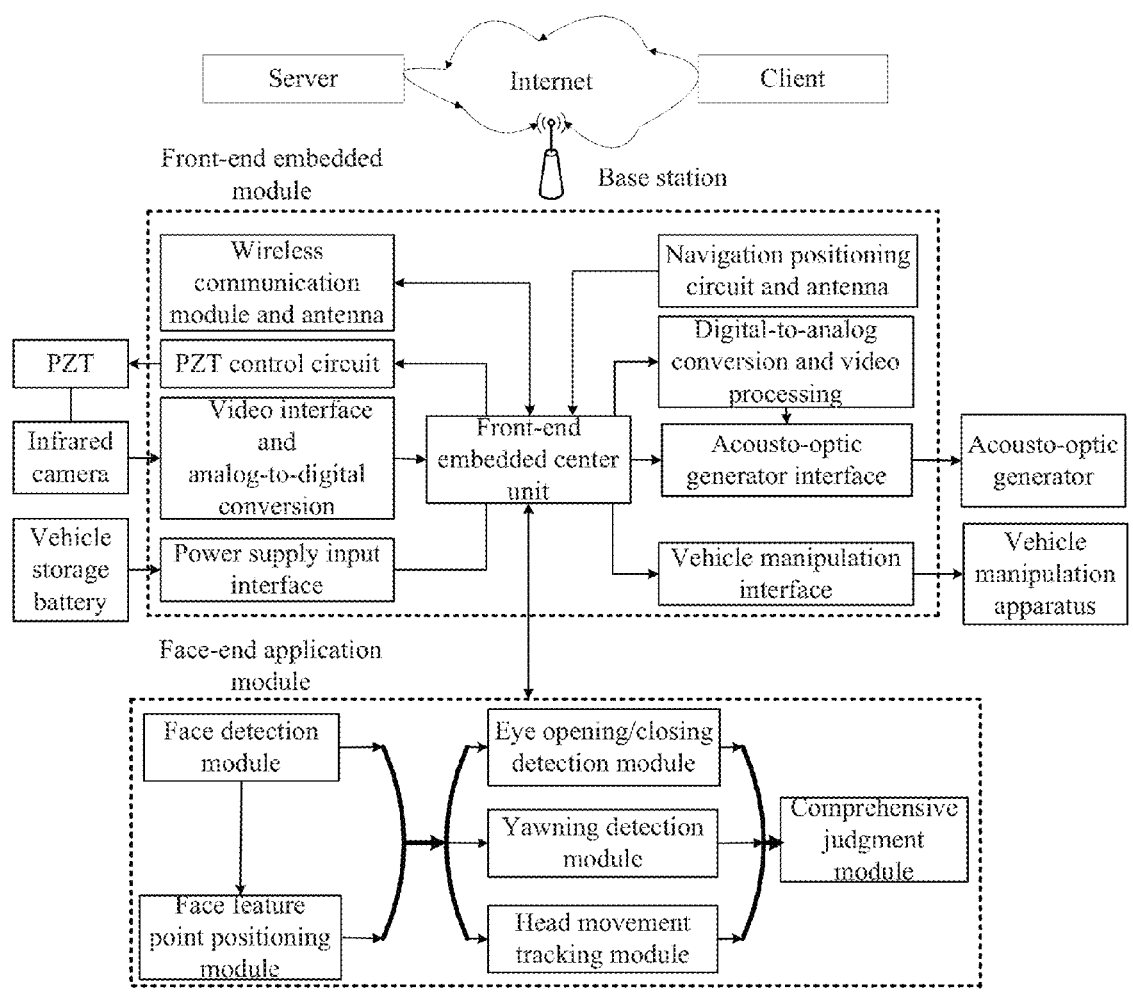
FIG. 7 is a schematic diagram of a formation principle of an electronic terminal for driver's fatigue degree detection.

FIG. 7 is a schematic diagram of a formation principle of an electronic terminal for driver's fatigue degree detection. The electronic terminal for driver's fatigue degree detection includes the following components: a camera, a Pan/Tilt/Zoom, an acousto-optic generator, a front-end embedded module and a front-end application module. The front-end embedded central unit serves as the center of the front-end embedded module, and the front-end embedded module further includes a power supply input module, a video interface and analog-to-digital conversion circuit, a Pan/Tilt/Zoom control circuit, a digital-to-analog conversion and video processing circuit, an acousto-optic generator interface, a vehicle manipulation interface, a wireless communication module and an antenna, and a navigation positioning module and an antenna. The front-end embedded central unit are separately connected to the power supply input module, the video interface and analog-to-digital conversion circuit, the Pan/Tilt/Zoom control circuit, the digital-to-analog conversion and video processing circuit, the acousto-optic generator interface, the vehicle manipulation interface, the wireless communication module and the antenna, and the navigation positioning module and the antenna. Meanwhile, the front-end embedded central unit is also connected to the front-end application module. The front-end application module is used for executing an algorithm for detecting the eye opening/closing state, the yawning state, and the head movement state, and making comprehensive judgment.

The front-end embedded central unit includes processor hardware as well as a corresponding driver program, and operating system software. The front-end embedded central unit is mounted at an appropriate position in the vehicle, may be implemented using an ARM series chip, an FPGA, a DSP or a single-chip microcomputer, and has a built-in clock. The Pan/Tilt/Zoom control circuit is used for providing Pan/Tilt/Zoom movement and camera lens zooming drive commands, so as to ensure a sufficiently large and complete driver head video image. The vehicle manipulation interface is connected to the manipulation apparatus of the vehicle, and is used for manipulating the brake and horn of the vehicle. The output of the vehicle storage battery is directly connected to the power supply input interface, and supplies power for a relevant device in the electronic terminal for driver's fatigue degree detection. The wireless communication module and the antenna, such as a GSM/GPRS/3G communication module and a corresponding SIM/USIM card, are used for implementing wide area network wireless communication. The navigation positioning module and the antenna can support receiving of information from satellites such as US GPS, Russia GNNS, European Galileo, and China Beidou-2 or support an inertial navigation system to perform navigation positioning, so as to learn the longitude and the latitude of the vehicle in real time, so that when the vehicle asks for help, a preset client is informed of the specific position through a server.

The camera is preferentially an infrared camera, and is mounted on the Pan/Tilt/Zoom. The Pan/Tilt/Zoom is mounted on a frame of a vehicle front windshield outside the driver, so as to ensure that the sight of the driver is not influenced and the mounting position is as height as the driver's head. The camera and the Pan/Tilt/Zoom are separately connected to the front-end embedded module, and are powered by the front-end embedded module. The camera transmits the driver head video image to the video interface and analog-to-digital conversion circuit in the front-end embedded module. The front-end embedded module provides Pan/Tilt/Zoom movement and camera lens zooming drive commands through the Pan/Tilt/Zoom control circuit, so as to ensure a sufficiently large and complete driver head video image. If natural light can ensure imaging requirements, the infrared lamp is turned off; otherwise, the infrared lamp is turned on.

The acousto-optic generator is connected to the acousto-optic generator interface. The acousto-optic generator may include a sound generator, a lamp (which may emit red light, orange light, yellow light, green light, and light of other colors) or a video display.

As shown in FIG. 7, the front-end application module in the electronic terminal for driver's fatigue degree detection further includes a face detection module, a face feature point positioning module, an eye opening/closing detection module, a yawning detection module, a head movement tracking module and a comprehensive judgment module. The face detection module and the face feature point positioning module are connected, and are separately connected to the eye opening/closing detection module, the yawning detection module and the head movement tracking module. The eye opening/closing detection module, the yawning detection module and the head movement tracking module are separately connected to the comprehensive judgment module, and feed driver fatigue degree information detected from different angles into the comprehensive judgment module for final evaluation.

The face detection module is used for finding the position of the face in the image based on data of an input single frame image, and indicating the position of the face using a rectangular frame. The face feature point positioning module is used for obtaining the positions of the five sense organs of the face based on the data of the input single frame image, and indicating the positions of the five sense organs using a coordinate sequence of multiple points. These function modules are implemented based on an existing pattern recognition method through software or firmware. The implementation is already illustrated in detail in the front-end detection module of the aforementioned vehicle anti-theft and anti-robbery network apparatus, and is not described herein.

Figure 8:
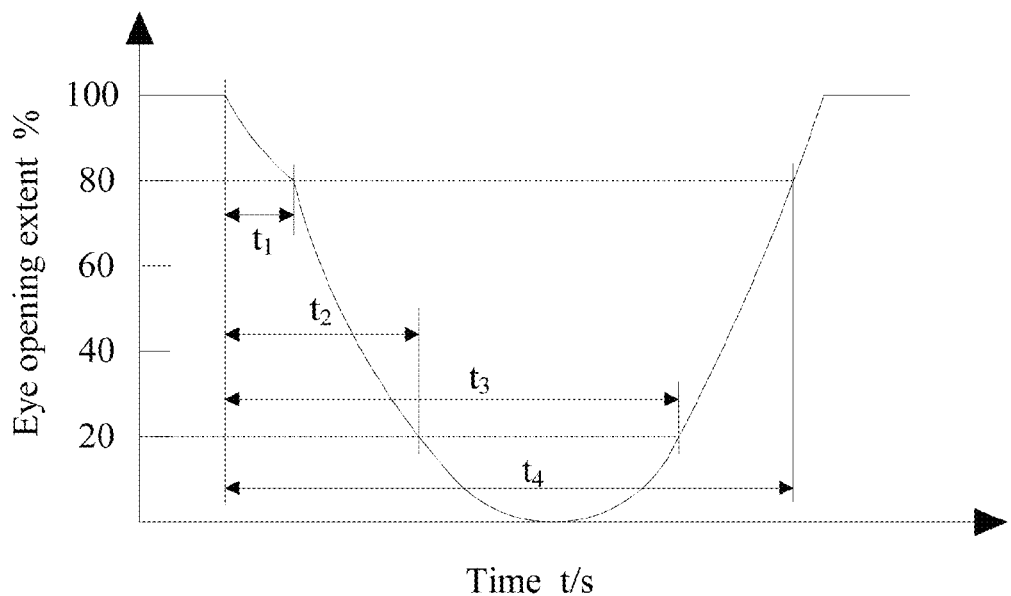
FIG. 8 is a schematic diagram of a principle for measuring a PERCLOS value.

The eye opening/closing detection module detects the eye closure rating of the driver using the PERCLOS algorithm. PERCLOS is short for percentage of eye closure, and refers to the proportion of the time when the eyes are closing within a certain period. In a specific experiment, three measuring manners, namely, P70, P80, and EM are available, in which it is deemed that P80 can reflect the person's fatigue degree to the largest extent. FIG. 8 is a diagram of a principle for measuring a PERCLOS value. In FIG. 8, the curve indicates the change of opening/closing degree of eyes in one closing and opening procedure of eyes, and the lasting time of a certain closing or opening degree of eyes to be measured can be obtained according to this curve, thereby computing a PERCLOS value. In FIG. 8, t1 is time from complete eye opening to 20% of eye closing; t2 is time from complete eye opening to 80% of eye closing; t3 is time from complete eye opening to 20% of eye opening next time; t4 is time from complete eye opening to 80% of eye opening next time. The PERCLOS value f can be obtained through measuring values from t1 to t4.

$$f = \frac{t_3 - t_2}{t_4 - t_1}$$

f is a percent of eye closing time to a certain period. For the P80 measuring manner, it can be deemed that when f>0.15, the driver is in a fatigue state.

Figure 9:
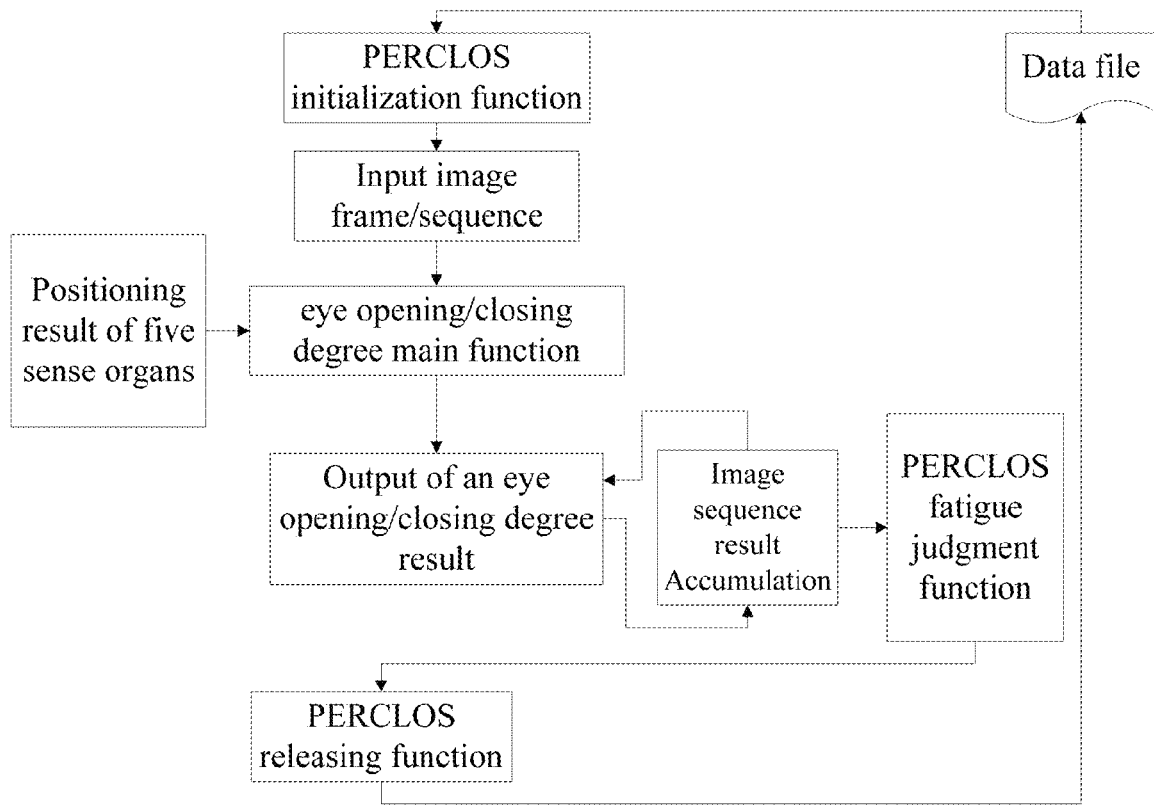
FIG. 9 is a schematic diagram of a working mode of an eye opening/closing detection module.

Based on the foregoing PERCLOS value measuring principle, the working mode of the eye opening/closing detection module is shown in FIG. 9. After data of an input single frame image is processed through the face detection module and the face feature point positioning module, positions of the five sense organs of a face can be obtained. Next, for each frame of image, an eye opening/closing degree main function is invoked, and in combination with a positioning result of the five sense organs, an eye opening/closing degree value can be obtained. Image sequence results of data of multiple frames of images are accumulated, and in combination with the eye opening/closing degree value of the multiple frames of images, a judgment result indicating whether the driver is fatigue can be obtained.

Figure 10:
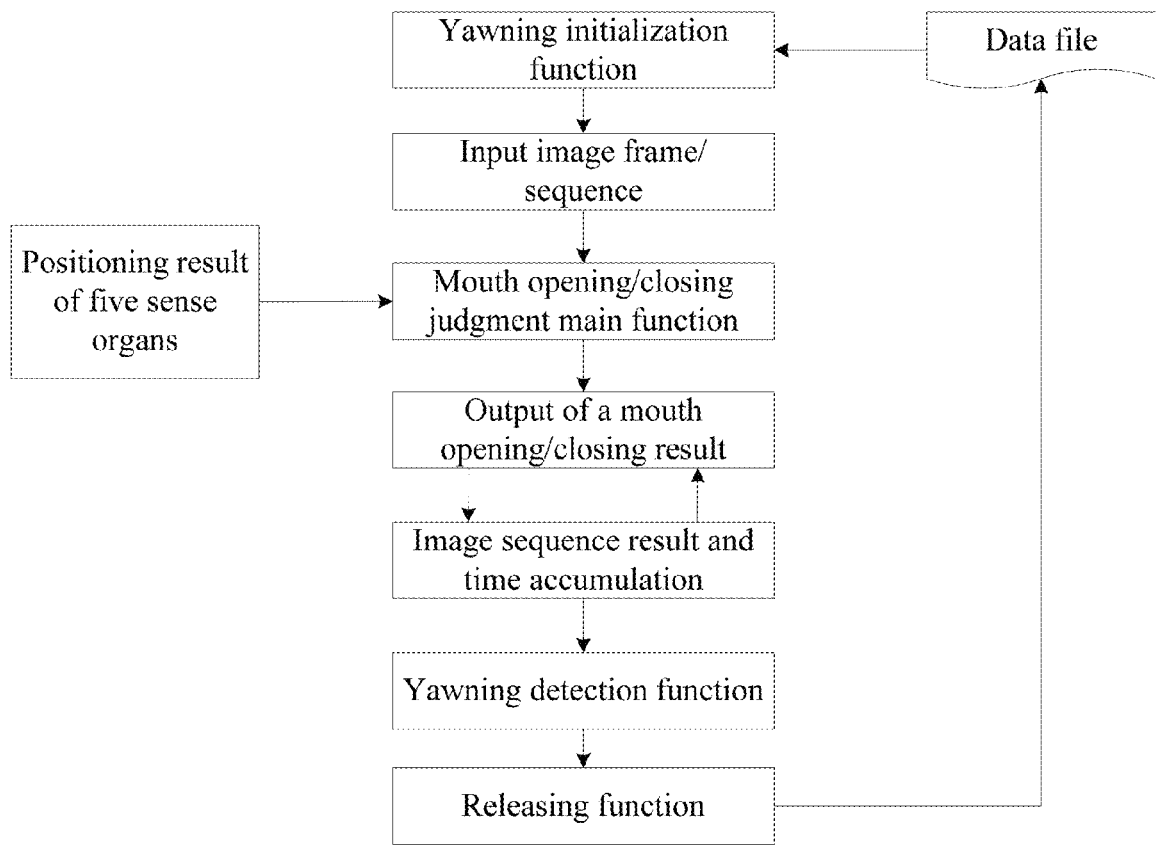
FIG. 10 is a schematic diagram of a working mode of a yawning detection module.

FIG. 10 shows a working mode of a yawning detection module. After data of an input single frame image is processed through the face detection module and the face feature point positioning module, positions of the five sense organs of the face can be obtained. After positions of the five sense organs of a face are obtained, for each frame of image, a mouth opening/closing judgment main function is invoked, and in combination with a positioning result of the five sense organs, a mouth opening/closing situation can be obtained. The mouth opening time is computed with reference to multiple frames of images, and a judgment result indicating whether the driver is fatigue can be obtained.

Figure 11:
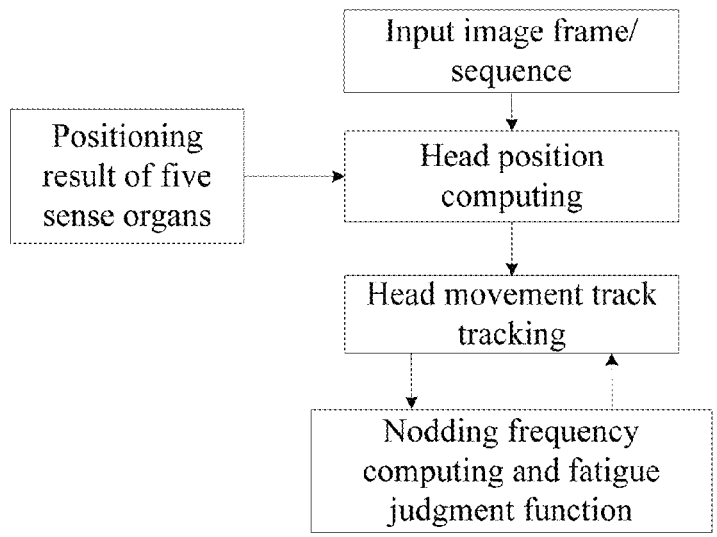
FIG. 11 is a schematic diagram of a working mode of a head movement tracking module.

FIG. 11 shows a working mode of a head movement tracking module. After data of an input single frame image is processed through the face detection module and the face feature point positioning module, positions of the five sense organs of the face can be obtained. After positions of the five sense organs of a face are obtained, a head position in each frame of image is separately computed, and in combination with a positioning result of the five sense organs, a head movement track can be obtained. The nodding frequency is computed with reference to multiple frames of images, and a judgment result indicating whether the driver is fatigue can be obtained.

The comprehensive judgment module performs a weighting operation on detection results obtained by the eye opening/closing detection module, the yawning detection module and the head movement tracking module. Based on comprehensive judgment on three types of fatigue feature monitoring on the eye opening/closing state, the yawning state, and the head movement state, the driver fatigue degree is divided into four ranks: green color—not fatigue, yellow color—slight fatigue, orange color—intermediate fatigue, and red color—high fatigue.

When none of the eye opening/closing detection module, the yawning detection module and the head movement tracking module detects abnormality, the detection result output by the comprehensive evaluation module is sobriety. The normal running of the vehicle is allowed, and a fatigue degree indicator lamp on the vehicle-mounted embedded device screen shows a green color.

When only one of the eye opening/closing detection module, the yawning detection module and the head movement tracking module detects abnormality, the detection result of the comprehensive evaluation module is slight fatigue. The normal running of the vehicle is allowed. A fatigue degree indicator lamp on the acousto-optic generator shows a continuously flickering yellow color, and the acousto-optic generator sends a warning sound to the driver.

When only two of the eye opening/closing detection module, the yawning detection module and the head movement tracking module detect abnormality, the detection result of the comprehensive evaluation module is intermediate fatigue. The fatigue degree indicator lamp on the acousto-optic generator shows a continuously flickering orange color, and meanwhile the acousto-optic generator sends a warning sound to the driver, the remote server and the preset client, to suggest that the driver should pull over.

When all of the eye opening/closing detection module, the yawning detection module and the head movement tracking module detect abnormality, the detection result of the comprehensive evaluation module is high fatigue. The fatigue degree indicator lamp on the acousto-optic generator shows a continuously flickering red color, an alarm lamp is automatically turned on to caution ambient vehicles and pedestrians, the vehicle automatically decelerates and the engine goes off in several seconds, and meanwhile the acousto-optic generator continuously sends an alarm to the remote server and the preset client and reports the position of the vehicle, to ask for help.

In the present invention, when the driver fatigue degree reaches the red color rank, the driver is in the disability state. Otherwise, the driver's capability can be dynamically updated according to the current fatigue degree monitoring value of the driver based on the following formula:

$$t_{dr}=t_{re}(1+k_{tiredness\_re})+t_{ex\_}(1+k_{tiredness\_ex}) \quad (3)$$

where coefficients in brackets separately indicate influences of the fatigue degree on the reaction capability and the manipulation capability.

To sum up, the detection result of person condition detection unit 1, namely, the driver capability is embodied as follows:

$$t_{dr}=t_{re}(1+k_{alcoholicity\_re})(1+k_{tiredness\_re})+t_{ex\_}(1+k_{alcoholicity\_ex})(1+k_{tiredness\_ex}) \quad (4)$$

Next, the specific structure and the working principle of the vehicle condition detection unit 2 in the intelligent traffic safety system are illustrated. In the present invention, the vehicle condition detection refers to detection on performance parameters of a vehicle, and computation of influence degrees of the performance parameters on crash avoidance manipulation time. The vehicle condition detection unit 2 is specifically divided into five underlying detection modules: vehicle basic parameter detection 21, vehicle dynamic parameter detection 22, gear position setting parameter detection 23, deceleration and braking parameter detection 24, and acceleration and starting parameter detection 25.

The vehicle basic parameter detection 21 includes the type, the size, and the no-load weight of a vehicle, which are generally set through entry in advance. With reference to the regional classification standard, the vehicles are classified into large-sized coach A1, tractor A2, city bus A3, medium-sized coach B1, large-sized wagon B2, small-sized manual transmission vehicle C1, small-sized automatic transmission vehicle C2, small-sized wagon C3, three-wheeled vehicle C4, and so on. The vehicle size (turning radius) is described through a three-dimensional envelope relative to a mounting position of the electronic terminal for implementing the present invention. The vehicle no-load weight is recorded as $m_0$ kilograms.

The vehicle dynamic parameter detection 22 mainly includes a load weight $m_p$, a current vehicle velocity $v_{car}$, tire aging and tire pressure change, and so on.

The load weight $m_p$ can be obtained through a load weight detection apparatus, and can also be preset before the vehicle is started.

The current vehicle velocity $v_{car}$ can be obtained through satellite positioning data or a vehicle-mounted CAN bus.

Automotive vehicles require regular maintenance and repair, and the tire pressure is adjusted to a regulated standard. However, during actual use, several tires wear out and age by different degrees, and performing abnormal pressure, thereby influencing vehicle manipulation performance. The vehicle running acceleration is expressed as follows:

$$a = k_{aging} \frac{f - f_{resistance}}{m_0 + m_p} \quad (5)$$

where $k_{aging}$ is the tire aging and tire pressure abnormality influencing coefficient, f is an acting force applied to the tires by a driving force or braking force with which the accelerator drives the engine (f is negative in the case of braking force), $f_{resistance}$ is a rolling resistance applied to the tires in contact with the ground, and is in a proportion to the total bearing weight, and a proportion coefficient μ is as follows:

$$\mu = \mu_0 - k v_{car} \quad (6)$$

The low tire pressure increases the rolling resistance, and the tire is deformed due to the movement, continuously causing energy loss, which approximately accounts for 90% to 95% of all the rolling resistance of the tire. If the tire air pressure is excessively high, the road holding force decreases, and the tire attrition accelerates. Under a non-standard tire pressure, the positive and negative deviation of the influence on the acceleration performance reaches 2% to 5%, and the positive and negative deviation of the influence on the braking performance reaches 5% to 10%. For this reason, a redundancy reliability monitoring apparatus for an internal working condition of a vehicle tire is specially disposed in the intelligent traffic safety system.

Figure 12:
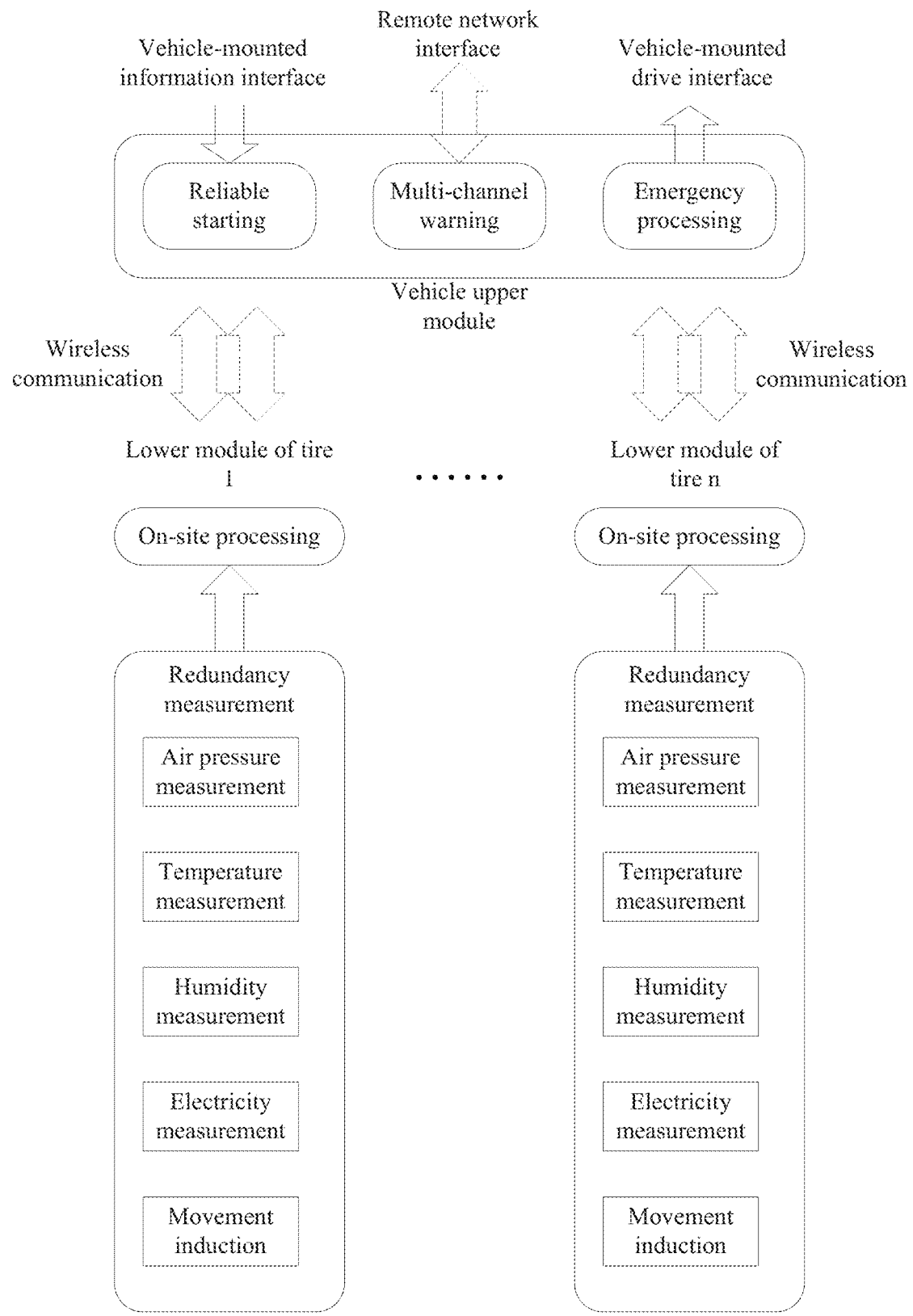
FIG. 12 is an overall schematic structural diagram of a redundancy reliability monitoring apparatus for an internal working condition of a vehicle tire.

FIG. 12 is a schematic diagram of a formation principle of the redundancy reliability monitoring apparatus. The redundancy reliability monitoring apparatus includes a vehicle upper module and a plurality of tire lower modules, in which the vehicle upper module is mounted inside a vehicle, and is formed of a reliable starting unit, a multi-channel warning unit and an emergency processing unit; the tire lower module is mounted inside each vehicle tire, and is formed of a redundancy measurement unit and an on-site processing unit. Each tire lower module and the vehicle upper module communicate with each other in a wireless manner. In the vehicle upper module, the reliable starting unit has a vehicle-mounted information interface, the multi-channel warning unit has a remote network interface, and the emergency processing unit has a vehicle-mounted drive interface.

Different from the prior art in which only a single sensor is used to perform in-tire state measurement, the redundancy reliability monitoring apparatus has a notable feature, that is, various sensors are disposed in the redundancy measurement unit, and are respectively used for implementing pressure measurement, temperature measurement, humidity measurement, electricity measurement and movement induction inside a vehicle tire. These sensors adopt a redundancy configuration manner, namely, one primary sensor and at least one backup sensor are set for the same measurement objective, and each sensor separately sends a measurement signal independently. Furthermore, the wireless communication interface between the tire lower module and the vehicle upper module also adopts a similar redundancy configuration manner. In this way, it can be ensured that when the primary sensor or wireless communication interface is invalid, correct information about the working condition state inside the vehicle tire can still be obtained.

The foregoing redundancy measurement unit is connected to the on-site processing unit. The on-site processing unit uses an embedded microprocessor in the tire lower module to perform on-site processing, including information collection, analysis and judgment, data uploading, shielding and switching, dormancy or wakeup. The information collection refers to collection of information such as movement induction, pressure measurement, temperature measurement, humidity measurement, and electricity quantity measurement. The analysis and judgment refer to analysis according to the collected measurement information and using the intrinsic mechanism of the on-site configuration solution, and judgment about whether dormancy or wakeup, data uploading, or shielding and switching should be performed.

The function of the reliable starting unit in the vehicle upper module lies in that: when the vehicle upper module learns that the vehicle starts and operates smoothly and steadily from a vehicle-mounted information interface such as a vehicle CAN bus or GPS receiver, but does not obtain uploaded data of a certain tire lower module, the reliable starting unit sends a command to the tire lower module to require uploading of data, or require active/standby switch of the movement induction sensor; otherwise, the communication interface is switched.

The multi-channel warning unit in the vehicle upper module has an LED display and caution sound warning in the prior art, and also adopts particular preset voice warning (which can be "slow air leakage of the front right tire" in Chinese, or in other languages or dialects; the voice warning has default presetting and can be set through recording), including performing remote warning through a wireless network.

The emergency processing unit in the vehicle upper module learns information relevant to driver capability decrease (such as the alcoholic strength: "slight drinking" or fatigue degree: "yellow color" warning) based on the vehicle-mounted information interface, and can automatically manipulate the vehicle to decelerate, pull over and brake through the vehicle-mounted drive interface.

From the perspective of reliability, it is always necessary to perform electricity management on the direct-type tire condition monitoring system, no matter it is an active type with a battery, a passive type using the tire movement to generate electricity, or a hybrid type using the movement to generate electricity and charge the battery. When the electricity measurement sensor reflects that the electricity is insufficient and warning is required, warning is performed through the on-site processing unit.

From the perspective of reducing power consumption, when a vehicle is parked and tires are motionless, the redundancy reliability monitoring apparatus should be dormant, and is not waken up to work until the vehicle starts and the tires rotate. For this reason, the movement induction sensor detects rotation and motionless situations of a tire, and the embedded microprocessor in the tire lower module decides whether the redundancy reliability monitoring apparatus should be waken up to work or remain dormant according to a detection result. When the tires are just changed from a motionless state to a rotating state, the tire lower module should continuously send data of the current tire condition to the vehicle upper module.

If the primary sensor in work is completely normal, it is judged whether the tire condition is normal according to the measurement information. If the primary sensor is abnormal, whether the abnormality matters further needs to be determined. The electricity consumed by the uploading communication accounts for an overwhelming majority, so if the abnormality matters, communication warning should be frequently uploaded; if the abnormality does not matter, warning is performed in an intermediate frequency; if primary sensor is normal, warning is performed in a sparse frequency. For example, the excessively high temperature that easily leads to tire burst matters very much, and rapid air leakage of a tire also matters very much.

Figure 13:
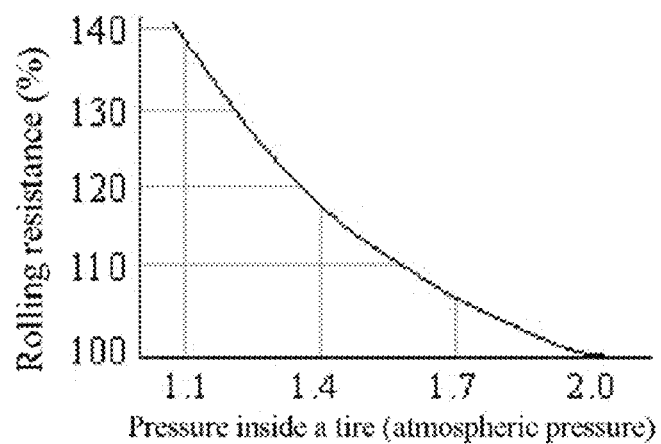
FIG. 13 is a schematic diagram of a relationship between a tire rolling resistance and a tire pressure.

Taking the tire pressure as an example, for example, the most preferable value of the internal pressure of a certain vehicle tire is 2.5 atmospheric pressure, as shown in FIG. 13. When the tire pressure is greater than 2.0 atmospheric pressure, tires still enable the whole vehicle to run, but if the tire pressure is lower than 2.0 atmospheric pressure and continues to decrease, the tire rolling resistance apparently increases. The embedded microprocessor in the tire lower module can judge whether the tire pressure is abnormal, and whether it is slow air leakage or rapid air leakage according to a relationship between the tire rolling resistance and the tire pressure shown in FIG. 13.

In another aspect, as for the detection of abnormality in the working primary sensor, various solutions are available, for example, if measurement data cannot be obtained, or messy codes always occur in the measurement data, the embedded microprocessor in the tire lower module can independently determine that the primary sensor is invalid. When the vehicle upper module knows that the vehicle has started and run through the vehicle-mounted information interface, but the tire lower module does not upload relevant data, it is possible that the primary movement induction sensor is abnormal. When tire pressure abnormality is found during regular maintenance, and no warning is obtained during the recent running, it is also possible that the primary pressure sensor is invalid.

When finding out that the primary sensor is abnormal, the embedded microprocessor in the tire lower module independently shields the detection interface, and obtaining of the measurement data is automatically switched to the backup sensor interface. If primary sensor abnormality is found in another manner, the vehicle upper module sends a command to the tire lower module, the tire lower module shields the corresponding detection interface after receiving the command, and obtaining of the measurement data is automatically switched to the backup sensor interface.

The gear position setting parameter detection 23 is recorded as $l_{speed}(v_{car})$, and can be preset according to a rated value of the current vehicle, for example: the speed of the first rank is below 20 kilometers per hour, the speed of the second rank is 20 kilometers to 40 kilometers per hour, the speed of the third rank is 40 kilometers to 60 kilometers per hour, the speed of the fourth rank is 60 kilometers to 80 kilometers per hour, and the speed of the fifth rank is more than 80 kilometers per hour.

In the deceleration and braking parameter detection 24, the vehicle braking capability can be indicated by the distance $d_{100}$ for which the vehicle moves during the deceleration from the speed of 100 kilometers per hour to the speed of zero, and an average maximum acceleration corresponding thereto is expressed as follows:

$$a_{brake,0} = \frac{(100000/3600)^2}{2 d_{v100}} \approx \frac{385.8}{d_{v100}} (m/s^2) \quad (7)$$

The above formula is directed to the no-load situation, and when the load reaches a certain degree, the formula should be appropriately modified as follows:

$$a_{brake} = \frac{m_0}{m_0 + m_p} a_{brake,0} \quad (8)$$

In the acceleration and starting parameter detection 25, the vehicle starting capability can be indicated by the time $t_{v100}$ required for acceleration from the speed of zero to the speed of 100 kilometers per hour, and an average maximum acceleration corresponding thereto is expressed as follows:

$$a_{gun,0} = \frac{100000/3600}{t_{v100}} \approx \frac{27.8}{t_{v100}} (m/s^2) \quad (9)$$

The above formula is directed to the no-load situation, and when the load reaches a certain degree, the formula should be appropriately modified as follows:

$$a_{gun} = \frac{m_0}{m_0 + m_p} a_{gun,0} \quad (10)$$

The specific structure and the working principle of the road condition detection unit 3 in the intelligent traffic safety system are further introduced below. In the present invention, the road condition detection refers to detection on the inherent performance, the dynamic condition and the environment situation of the current road, and computation of influencing degrees of the inherent performance, the dynamic condition and the environment situation on crash avoidance manipulation time. The road condition detection unit 3 is specifically divided into six underlying detection modules: road basic parameter detection 31, weather influencing factor detection 32, road busy degree detection 33, front barrier detection 34, rear pursuer detection 35, and opposite pursuer detection 36.

Figure 14:
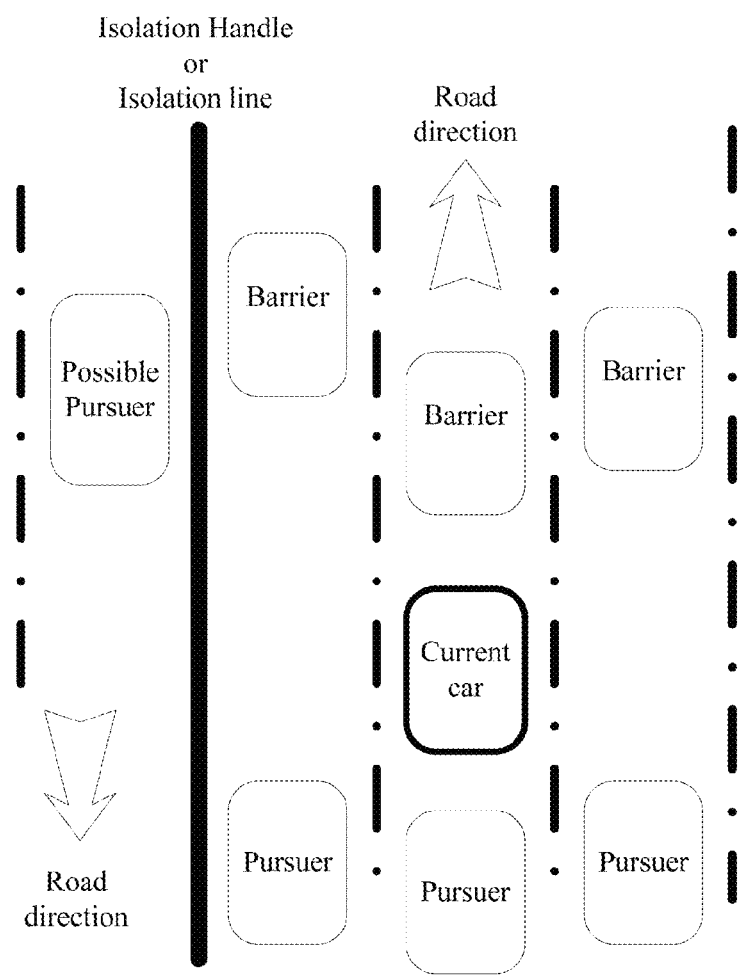
FIG. 14 is a schematic diagram of a road condition of a typical bidirectional road.

The content of the road basic parameter detection 31 includes one-way lane, bidirectional lane, isolation, the number of vehicle lanes, evenness, camber and gradient, most of which can be obtained through a commercial navigation product based on positioning and a digital map currently. For the bidirectional lane shown in FIG. 14, when the middle bold black line only represents physical isolation implementation, the bidirectional lane is an isolation road.

As for the camber and the gradient of a road, existing road navigation technologies rely on a fixed digital map, generally can only provide an approximate forward direction or measure and compute the camber/gradient of the current position of the vehicle, and cannot estimate the camber/gradient of the front road in advance. This technical defect is not favorable to further development of the automatic driving technology and the active anti-crash technology of the vehicle. As for the active anti-crash technology, prediction of the camber and the gradient of the front road is preferred. For this reason, a pre-estimation method for computing a camber and a gradient of a front road is proposed herein.

Figure 15:
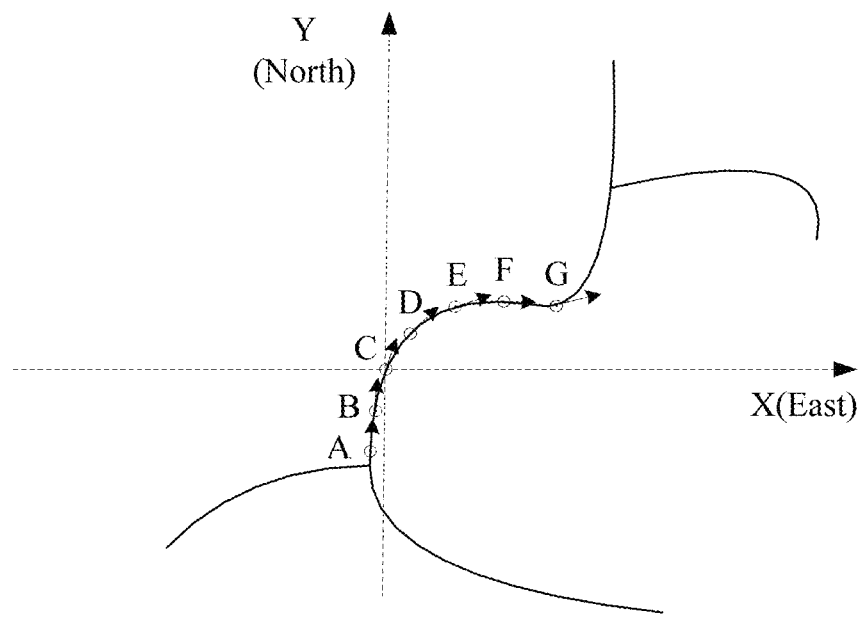
FIG. 15 is a schematic diagram of a pre-estimation method for computing a camber and a gradient of a front road.

As shown in FIG. 15, first, it is assumed that a running vehicle is currently located at point C, and a two-dimensional dynamic azimuth coordinate system is established with the point as the origin, in which the transverse coordinate x axis is eastbound, and the longitudinal coordinate y axis is northbound. In the prior art, it is realized that for any given point, and the closest road can be found (for details, reference can be made to "Satellite Positioning, Traffic Monitoring and Digital Map" written by Pao Yuanlv, and Liu Zhen'an, ISBN: 7118046221, National Defense Industry Press, published in 2006). Therefore, situations of the road where point C is located and ambient roads can be obtained using the prior art, which is not described in detail herein.

Secondly, an arc length interval $$\Delta s = \frac{l_{car}}{d_{jam}}$$

is determined according to the length $l_{car}$ of the vehicle and a road jam degree $d_{jam}$, multiple points are selected according to an interval $\Delta s$ between two adjacent points in the front and back of the road, for example, two points A, B behind the vehicle are selected, four points D, E, F, G in front of the vehicle are selected, a coordinate value of each point in the dynamic azimuth coordinate system is obtained according to the longitude/latitude of each of the points A, B, C, D, E, F, G and the values are recorded as two column vectors:

$$X^T = (x_A, x_B, x_C, x_D, x_E, x_F, x_G)^T, Y^T = (y_A, y_B, y_C, y_D, y_E, y_F, y_G)^T.$$

Thirdly, fitting is performed based on the known column vectors to obtain the following three-dimensional polynomial as well as a first-order derived function and a second-order derived function thereof:

$$y = a_0 + a_1 x + a_2 x^2 + a_3 x^3, \dot{y} = a_1 + 2a_2 x + 3a_3 x^2, \ddot{y} = 2a_2 + 6a_3 x$$

in which, $$(a_0, a_1, a_2, a_3)^T = \begin{pmatrix} m & \sum_{i=1}^m x_i & \sum_{i=1}^m x_i^2 & \sum_{i=1}^m x_i^3 \\ \sum_{i=1}^m x_i & \sum_{i=1}^m x_i^2 & \sum_{i=1}^m x_i^3 & \sum_{i=1}^m x_i^4 \\ \sum_{i=1}^m x_i^2 & \sum_{i=1}^m x_i^3 & \sum_{i=1}^m x_i^4 & \sum_{i=1}^m x_i^5 \\ \sum_{i=1}^m x_i^3 & \sum_{i=1}^m x_i^4 & \sum_{i=1}^m x_i^5 & \sum_{i=1}^m x_i^6 \end{pmatrix}^{-1}$$

$$\left( \sum_{i=1}^m y_i, \sum_{i=1}^m x_i y_i, \sum_{i=1}^m x_i^2 y_i, \sum_{i=1}^m x_i^3 y_i \right)^T$$

a curvature radius is expressed as follows:

$$R = \frac{(1 + \dot{y}^2)^{3/2}}{\ddot{y}} \quad (12)$$

and a direction angle is expressed as follows:

$$\psi = \begin{cases} \arctan(\dot{y}) & \text{if } x \geq 0 \\ \arctan(\dot{y}) + \pi & \text{if } x < 0, y \geq 0 \\ \arctan(\dot{y}) - \pi & \text{if } x < 0, y < 0. \end{cases} \quad (13)$$

Then, the direction change quantity $\Delta \psi$ of each point relative to a previous point is computed, and is written in a column vector in the following form:

$$\Psi^T = (*, \psi_B - \psi_A, \psi_C - \psi_B, \psi_D - \psi_C, \psi_E - \psi_D, \psi_F - \psi_E, \psi_G - \psi_F)^T \quad (14)$$

When $\Delta \psi > 0$, it means that the front road turns left, and when $\Delta \psi < 0$, it means that the front road turns right.

In practice of the vehicle active anti-crash technology, it is unnecessary to precisely know the specific value of the direction change quantity; instead, values are classified into 5 ranks based on the magnitude thereof: sharp left turn, small left turn, no turn, small right small, and sharp right turn. According to the bending degree of the front road, the active anti-crash apparatus inside the vehicle can take corresponding technical measures in advance, such as automatic deceleration, and warning in advance.

The similar method can be used for pre-estimating the gradient of the front road, and in this case, the foregoing longitude/latitude parameter is changed to an altitude parameter. When the gradient of the front road is computed, polynomial fitting can be performed on the change of the altitude of the front road along with the arc length, and simpler approximate computing can also be performed using a trigonometric function. For example, for points B, D, and F in FIG. 15, the following formula can be obtained:

$$\theta_B = \arctan\left(\frac{h_C - h_A}{2\Delta s}\right), \theta_D = \arctan\left(\frac{h_E - h_C}{2\Delta s}\right), \quad (15)$$
$$\theta_F = \arctan\left(\frac{h_G - h_E}{2\Delta s}\right)$$

Likewise, in practice of the vehicle active anti-crash technology, gradients of the front road are classified into 5 ranks according to the magnitude thereof: abrupt downward slope, gentle downward slope, no slope, gentle upward slope, and abrupt upward slope. The active anti-crash apparatus inside the vehicle can take corresponding technical measures in advance, such as accelerating, and braking by use of the engine.

The weather influencing factor detection 32 includes detection on fog, rain, ice, snow and so on, and generally may be obtained through communication between the vehicle-mounted information system and the traffic network facility. For $\mu_0$ in formula (6), the value is 0.77 on an ordinary road surface, the value is 0.9 on a slip-resistant road surface, and the value is 0.64 on a slip-apt road surface; an abnormal weather causes an unpredictable severe influence on the road surface.

The result of the road busy degree detection 33 may also be obtained through communication between the vehicle-mounted information system and the traffic network facility. According to the extent, the road busy degrees can be classified into four ranks: severe jam (average speed<20 kilometers per hour), slight jam (20 kilometers per hour<average speed<0.6 time of the speed limit), unblocked (0.6 time of the speed limit<average speed<1.2 times of the speed limit), and sparse vehicle flow (average vehicle flow<one vehicle per minute).

In the prior art, although a safety air bag and safety belts are used as protection measures, the protection measures are only passive protection after a vehicle crash occurs. To find the front and rear vehicles in time before a crash occurs and to avoid the crash are the keys of reducing such traffic accident. The front barrier detection 34 can detect dynamic change situations of the relative direction, the distance and the speed of a target using a vehicle active anti-crash module based on a microwave radar. When it is found through the detection result that the target is located in front of the current vehicle, and the movement direction thereof is close to that of the current vehicle, the target is a front barrier.

Figure 16:
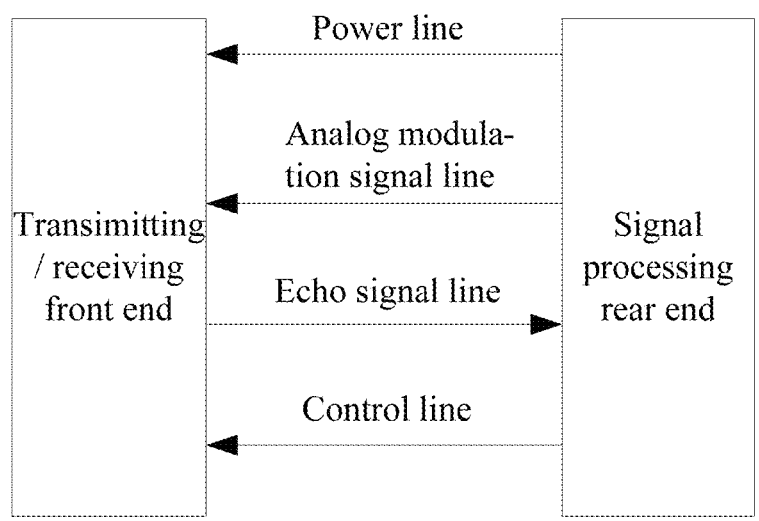
FIG. 16 is an overall schematic structural diagram of a vehicle active anti-crash module based on a microwave radar.

FIG. 16 is an overall schematic structural diagram of a vehicle active anti-crash module based on a microwave radar. The vehicle active anti-crash module is formed of a transmitting/receiving front end and a signal processing rear end. The transmitting/receiving front end and the signal processing rear end are connected through a power line, a control line, an analog modulation signal line and an echo signal line. The control line is used for transmitting an enabling control signal for controlling working state switching of the transmitting/receiving front end. The analog modulation signal line is used for transmitting an analog modulation signal input from the signal processing rear end to the transmitting/receiving front end. The echo signal line is used for transmitting an echo signal from the transmitting/receiving front end to the signal processing rear end. The analog modulation signal line and the echo signal line are connected through a port cable of a coaxial-cable connector.

Figure 17:
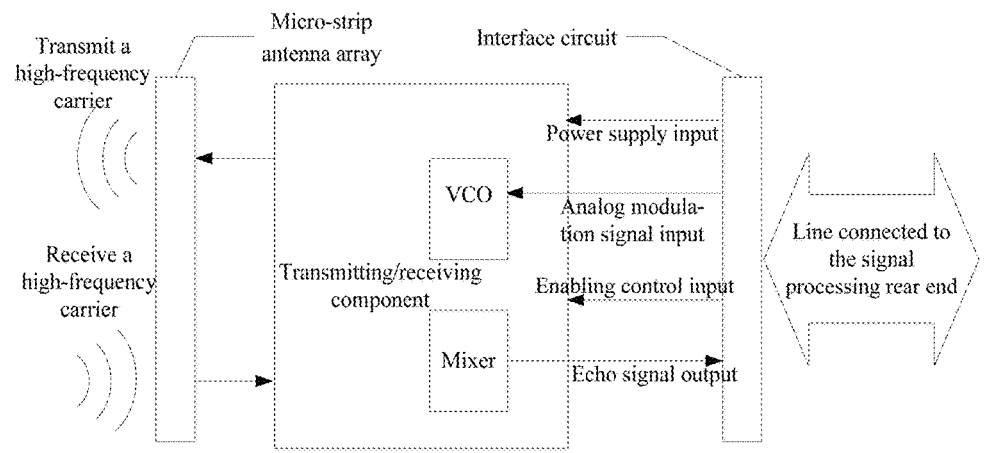
FIG. 17 is a schematic structural diagram of a transmitting/receiving front end of the microwave radar shown in FIG. 16.

As shown in FIG. 17, the transmitting/receiving front end is formed of a micro-strip antenna array, a transmitting/receiving component and an interface circuit. The micro-strip antenna array is connected to the transmitting/receiving component, and the transmitting/receiving component is connected to the interface circuit. The micro-strip antenna array is used for receiving/transmitting a high-frequency carrier. The transmitting/receiving component mainly includes a VCO and a mixer, in which the VCO receives an analog modulation signal input from the interface circuit, and the mixer outputs an echo signal to the interface circuit.

Figure 18:
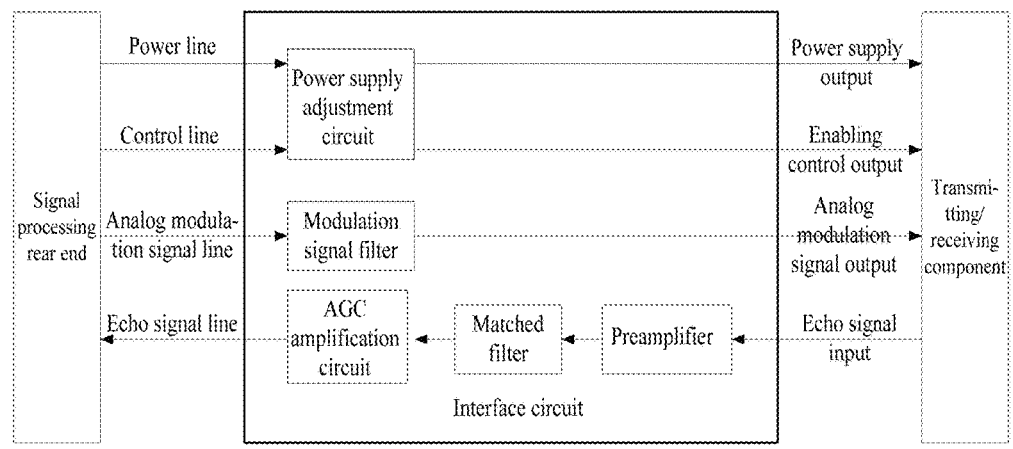
FIG. 18 is a schematic structural diagram of an interface circuit in the transmitting/receiving front end.

As shown in FIG. 18, the interface circuit includes: a preamplifier, a matched filter, an AGC amplification circuit, a modulation signal filter and a power supply adjustment circuit. The preamplifier, the matched filter and the AGC amplification circuit are sequentially connected, and have the function of performing filtering and amplification processing on the echo signal. The modulation signal filter is connected between the signal processing rear end and the transmitting/receiving component, and has the function of performing filtering processing on an analog modulation signal generated by the signal processing rear end. The power supply adjustment circuit is also connected between the signal processing rear end and the transmitting/receiving component, and has the following functions: ① a voltage stabilization function: stabilizing the voltage supplied to the transmitting/receiving front end 1, so as to enable the transmitting/receiving front end to work normally; and ㉒ voltage adjustment: responding to an enabling control input of the signal processing rear end, and adjusting the voltage to generate an adjustable voltage of −5V, 0, and +5V, so as to control the working state of the transmitting/receiving front end through the adjustable voltage.

Figure 19:
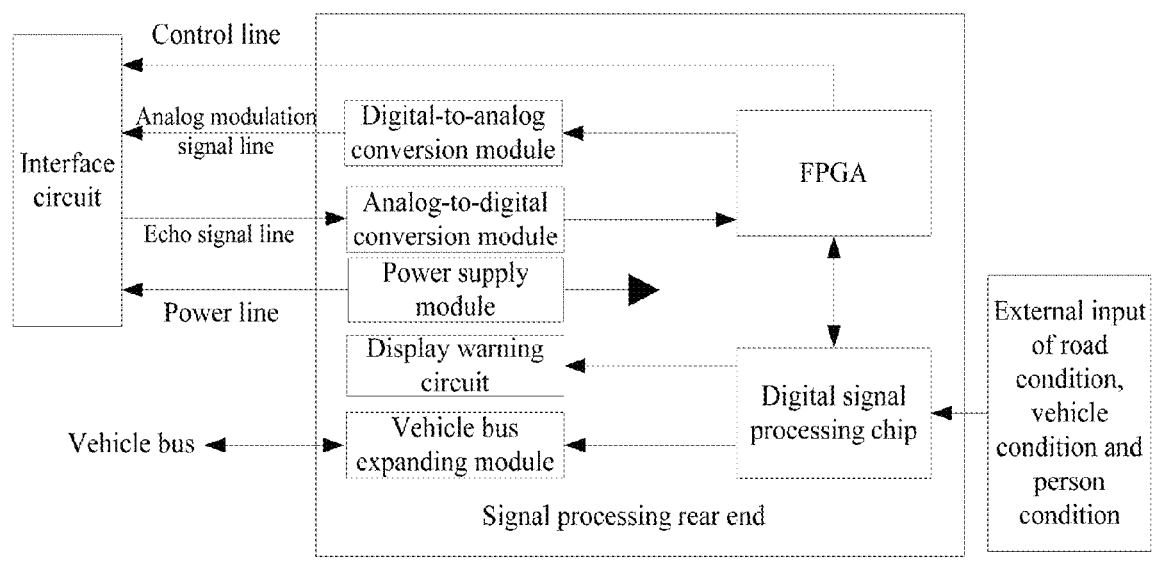
FIG. 19 is a schematic structural diagram of a signal processing rear end of the microwave radar shown in FIG. 16.

The internal structure of the signal processing rear end is shown in FIG. 19. The signal processing rear end is formed of an analog-to-digital conversion module, an FPGA, a digital signal processing chip, a digital-to-analog conversion module, a display warning circuit, a vehicle bus expanding module and a power supply module. The analog-to-digital conversion module receives an analog signal of the interface circuit through an echo signal line, and inputs a digital signal obtained through conversion to the FPGA. The digital-to-analog conversion module 16 receives a digital modulation signal from the FPGA, performs digital-to-analog conversion on the digital modulation signal, and outputs the signal to the interface circuit through an analog modulation signal line. The FPGA has the following functions: ① receiving a control signal input of a digital signal processing chip, so as to judge whether to start analog-to-digital conversion and when to start, and when to stop; ② performing software filtering on the data obtained through conversion of the analog-to-digital conversion module and storing the data obtained after filtering; ③ generating a digital modulation signal, and controlling the digital-to-analog conversion module to perform digital-to-analog conversion on the digital modulation signal; and ④ sending a control signal through the control line, and controlling the working state of the transmitting/receiving front end. The FPGA is connected to the digital signal processing chip. The digital signal processing chip receives external input signals about the road condition, the vehicle condition and the person condition. The digital signal processing chip is connected to the display warning circuit in an aspect, and accesses the vehicle bus through the vehicle bus expanding module in another aspect. Its main functions are as follows: ① performing mathematical operation processing on a signal conversion result of the analog-to-digital conversion module stored in the FPGA, and extracting speed and distance information of the target from the signal conversion result; ② inputting the speed and distance information of the target to the display warning circuit for acousto-optic display warning; ③ sending a control instruction to the FPGA, so as to decide whether to start the analog-to-digital conversion, when to start, and when to stop. The function of the display warning circuit lies in performing sound or display warning on the speed and distance information input by the digital signal processing chip. The function of the vehicle bus expanding module lies in converting a serial bus of the digital signal processing chip into a vehicle bus adopting the CAN and 485 standards. The function of the power supply module lies in providing multiple voltage ranks to supply power to the entire vehicle active anti-crash module.

In one specific embodiment of the current vehicle active anti-crash module, the digital signal processing chip uses a TMS320C6713 processor of TI Corporation, performs Fast Fourier Transform (FFT) processing on a collected and converted signal, and extracts distance and speed information of the corresponding target. A two-hundred-thousand-gate SPARTAN FPGA is selected for corresponding storage, AD control, modulation wave generation, software filtering, and enabling control output programming. An AD9240 analog-to-digital conversion module with double channels, 14 bits, and a sampling rate of 10M is selected. The entire system uses a 12V power source, and performs corresponding voltage stabilization and level conversion to supply power to the corresponding chip and circuit. Particularly, level conversion is performed in the interface circuit of the transmitting/receiving front end, so as to output a positive level, a negative level, and a zero level. The display warning circuit uses an ARM9 processor, an LCD display screen and a microphone, and the ARM9 processor receives the output of the speed and distance information of TMS320C6713.

The working principle of the current vehicle active anti-crash module is illustrated in detail below.

First, the FPGA sends a digital modulation signal, and the digital modulation signal is converted into an analog modulation signal-triangular wave/sawtooth wave through the digital-to-analog conversion module. The analog modulation signal is transmitted to the modulation signal filter in the interface circuit through the analog modulation signal line. Noise is removed through filtering processing, and the analog modulation signal with the noise removed is then transmitted to the VCO of the transmitting/receiving component. A high-frequency carrier is generated, and this high-frequency carrier is sent out through the micro-strip antenna array. After being sent out through the micro-strip antenna array, the high-frequency carrier is reflected back when encountering a barrier, is received through the micro-strip antenna array, and is transmitted to the transmitting/receiving component. The high-frequency carrier is processed by the transmitting/receiving component, output by the mixer to the interface circuit, then processed sequentially processed by the preamplifier, the matched filter, and the AGC amplification circuit, and is transmitted to the signal processing rear end through the echo signal line.

At the signal processing rear end, the signal reflected back is transmitted to the analog-to-digital conversion module. Herein, an analog signal is converted into a digital signal, and the data obtained through conversion is transmitted to the FPGA in real time for software filtering, and the data after filtering is stored. When the analog-to-digital conversion module completes a sampling conversion procedure, the FPGA feeds the stored data into the digital signal processing chip for mathematical operation processing, and capture distance and relative speed information of the target barrier from the data.

Subsequently, the digital signal processing chip transmits the distance and speed information to the display warning circuit. The display warning circuit generates, according to the distance and the speed of the target barrier relative to the current vehicle, a sound or display alarm for the driver, to remind the driver to decelerate or brake. In another aspect, the digital signal processing chip converts a serial signal into a signal conforming to the CAN or 485 standard through the vehicle bus expanding module, so as to be conveniently connected to another device inside the vehicle using the CAN or 485 standard, and transfer the distance information, the speed information, and the warning information or perform relevant control output according to the distance and speed information.

When the current vehicle active anti-crash module is working, the distances, the speeds and the running directions of front, rear, left, and right barriers of the current vehicle relative to the current vehicle are detected through a vehicle-mounted microwave radar, and the driver is informed of a detected result by the display warning module in time through warding or display. The microwave radar captures vehicle condition information through the vehicle bus expanding module. The vehicle condition information is combined with road condition information and person condition information (detection results on front, rear, left, and right barriers obtained by the microwave radar belong to the road condition information), and comprehensive computing is performed, so as to provide the driver with operation suggestions, such as deceleration, braking, and steering. In another aspect, the operation of the driver is captured and judged through the vehicle bus. When it is found that the vehicle crash danger gradually increases but the driver does not react in time, or fatigue driving and drunk driving that may easily lead to slow reaction of the driver occur, and the action is not performed in time, a reminder is provided again and a control instruction is sent to the vehicle bus, to instruct the vehicle to take non-artificial risk avoidance measures such as safety air bag opening, mandatory braking, and mandatory deceleration.

The rear pursuer detection 35 can be implemented using the foregoing vehicle active anti-crash module based on a microwave radar. When it is found through a detection result that the target is located behind the current vehicle, and the movement direction thereof is close to that of the current vehicle, the target is a rear pursuer.

The opposite pursuer detection 36 can be implemented using the foregoing vehicle active anti-crash module based on a microwave radar. When it is found through the detection result that the target is located in front of the current vehicle, the movement direction thereof is opposite to that of the current vehicle, and the road is not isolated, the target is an opposite pursuer.

Based on the detection results of the person condition detection unit 1, the vehicle condition detection unit 2 and the road condition detection unit 3, for a certain target (barrier or pursuer) relative to the current vehicle, the relative distance measurement value is recorded as $r_{mea}$. It is assumed that the maximum value and the minimum value of the possible measurement error of the relative distance are respectively $e_{rmax}(r_{mea})$, $e_{rmin}(r_{mea})$. The relative distance reference value $r_{relative} \in [r_{mea} - e_{rmin}(r_{mea}), r_{mea} + e_{rmax}(r_{mea})]$. The relative speed measurement value is recorded as $v_{mea}$. It is assumed that the maximum value and the minimum value of the possible measurement error of the relative speed are respectively $e_{vmax}(r_{mea},v_{mea}), e_{vmin}(r_{mea},v_{mea})$. The relative speed reference value $v_{relative} \in [v_{mea}-e_{vmin}(r_{mea}), v_{mea}+e_{vmax}(r_{mea})]$.

An avoidance requirement of a crash with a front single-target barrier is first considered. If no intervention is applied, after the time expressed as follows:

$$t_{relative} = \frac{r_{relative}}{v_{relative}} \quad (16)$$

a direct crash between current vehicle and the target may occur.

The influence of a person condition is considered. With reference to formula (4), the most basic requirement for avoiding a crash is to satisfy the following non-intervention crash incurrence time criterion:

$$t_{relative} > t_{dr} \quad (17)$$

The influence of a vehicle condition is further considered. Avoidance of rear-end collision with the front barrier is taken as an example, and even if measures can be taken, the most basic requirement is expressed as follows:

$$a_{relative} = \frac{v_{relative}}{t_{relative}} = \frac{v_{relative}^2}{r_{relative}} < a_{brake} \quad (18)$$

The influence of a road condition is further considered. The following intervention acceleration constraint criterion needs to be satisfied:

$$\frac{v_{relative}^2}{r_{relative}} < k_{gradient} k_{crooked} a_{brake} \quad (19)$$

where, $k_{gradient}, k_{cooked}$ separately indicate the gradient influencing coefficient and the camber influencing coefficient calculated based on formula (13)~(15). For example, according to sharp camber, small camber and no camber, $k_{crooked}$=3.0, 1.5, 1.0 correspondingly; and according to sharp gradient, small gradient and no gradient, $k_{gradient}$=3.0, 1.5, 1.0 correspondingly.

For a rear single-target pursuer, it is only required to replace $a_{brake}$ at the right side of formulas (18) and (19) with $a_{gun}$.

For an opposite pursuer, as the relative distance is smaller and smaller, it should be ensured that the relative speed is appropriately less than double of the speed limit, and the vehicle should remain in the current running lane as far as possible.

For threats from multiple targets, a target with a greater threat should be avoided in priority.

The driver warning unit 5 in the intelligent traffic safety system gives a multimedia augmented reality alarm to the driver through combining a graphical interface and voice, so that the driver intuitionally feels the surrounding anti-crash safety environment. The warning is classified into the acceleration/deceleration yellow warning, the acceleration/deceleration red warning, and the steering and lane changing operation prompt.

The yellow warning is defined on the basis of the assumption that a crash may occur if no manipulation measure is taken. Based on formula (17), formula (17) is multiplied by a weighting coefficient $n_{yellow}$, namely, when $$t_{relative} < n_{yellow} t_{dr} \quad (20)$$

an acceleration or braking yellow warning is sent to the driver of the current vehicle. To avoid an active rear-end collision, a braking warning is sent; to avoid a passive rear-end collision, an acceleration warning is sent; to avoid front and rear targets at the same time, a steering and lane changing prompt is sent.

Under the circumstance that a yellow warning is already sent and is not released, the red warning is defined on the basis of the assumption that a crash may occur even if the vehicle acceleration/deceleration ultimate capability is brought into play. Based on formula (18), formula (18) is multiplied by a weighting coefficient $n_{red}$, namely, when $$a_{relative} > n_{red} a_{brake} \quad (21)$$

an acceleration or braking red warning is sent to the driver of the current vehicle. To avoid an active rear-end collision, a braking warning is sent; to avoid a passive rear-end collision, an acceleration warning is sent; to avoid front and rear targets at the same time, a steering and lane changing prompt is sent.

Figure 20:
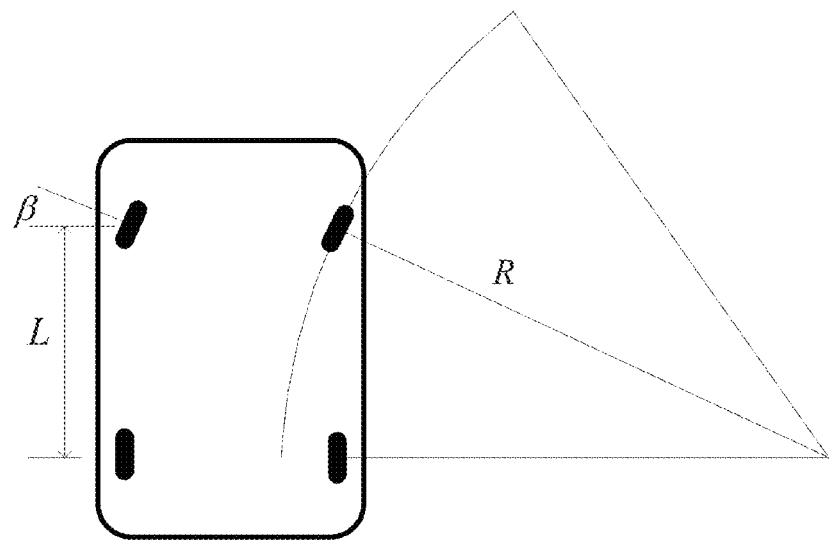
FIG. 20 is a schematic diagram of a direction angle formed when a vehicle steers to change a lane.

Before the steering and lane changing, whether there is a crash threat in the target lane needs to be considered. Meanwhile, matching between the vehicle and the road condition also needs to be considered. As shown in FIG. 20, it is assumed that the vehicle wheel span is L; according to the vehicle system dynamics principle, the maximum steering angle of the vehicle wheel is about 45 degrees, and if the steering wheel rotates by n cycles, the steering angle $\psi_{sw}$ of the vehicle wheels and the steering wheel are respectively expressed as follows:

$$\beta \approx \arcsin(L/R), \psi_{sw}=8n\beta. \quad (22)$$

For a road condition of a large camber, mandatory processing of correcting the steering angle of the steering wheel should be performed according to the above formula, and the speed should be further appropriately reduced, so as to ensure that the outward centrifugal force $mv^2/R$ caused by the vehicle velocity is less than a lateral adhesion force, and ensure that a roll moment generated by the centrifugal force is less than the anti-roll moment generated by the weight of the vehicle.

When the alcoholic strength or fatigue degree of the driver exceeds the limit, it is deemed that the driver is incapable of performing an anti-crash operation in time, so the current vehicle mandatory processing unit 6 mandatorily performs acceleration, deceleration, and steering and lane changing processing.

When the speed of the front target vehicle is excessively low, or a pedestrian is under a crash threat of the current vehicle, the barrier warning unit 7 sends a voice alarm to the front target vehicle or the pedestrian through a loudspeaker.

When the speed of a rear approaching vehicle or an opposite approaching vehicle is excessively high, the pursuer warning unit 8 sends a voice alarm to the rear or opposite approaching vehicle through a loudspeaker.

When the current vehicle is already in a crash accident, the after-crash warning unit 9 transmits the geographic position, the accident condition and the on-site video recorded by the vehicle-mounted positioning device to the remote monitoring terminal using the wireless communication network.

The intelligent traffic safety system provided in the present invention can be implemented based on technical supporting means such as a cloud computing platform and a wireless network (including a wireless local area network and a wide area wireless network). Through the cloud computing platform and the wireless network, the intelligent traffic safety system can implement information exchange among three major essential factors: vehicle, person, and facility. The information exchanged between the cloud computing platform and each vehicle-mounted electronic terminal includes road condition information, vehicle condition information, and person condition information. Detailed illustration is provided below.

Figure 21:
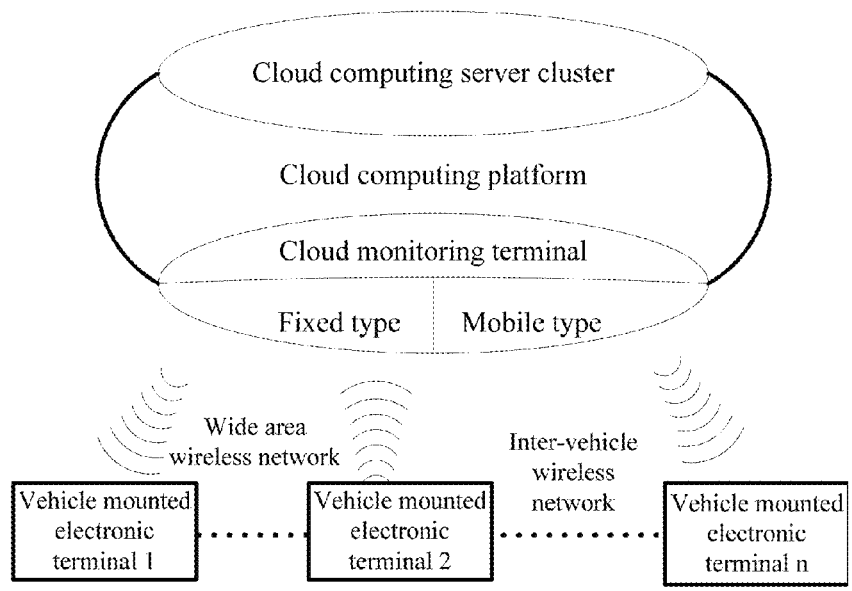
FIG. 21 is an overall schematic architectural diagram of the intelligent traffic safety system implemented based on a cloud computing platform and a wireless network.

As shown in FIG. 21, the intelligent traffic safety system is formed of a server supporting cloud computing, several vehicle-mounted electronic terminals (or other mobile terminals) mounted on vehicles and a cloud monitoring terminal mounted on a traffic infrastructure. The cloud computing platform is formed of a cloud computing server and a cloud monitoring terminal, and provides elementary computing for the entire intelligent traffic safety system, provides a management function, and provides functions of statistics, storage, sharing, and issuing of massive data. The cloud computing platform is connected to each vehicle-mounted electronic terminal through a wide area wireless network and/or cable network, and the vehicle-mounted electronic terminals are connected with each other through a wireless network.

Cloud computing servers can be deployed in public security departments of administrative regions such as a province, a city, a town, and a district. These servers form a distributed server cluster, each level of servers is networked with a database of a superior or peer public security department. Sharing and transfer of data information about traffic safety and security are performed in the cluster, and management levels and rights as well as liabilities are classified into different ranks. The cloud computing server allocates the supervision management authority to the cloud monitoring terminal. The command center where the cloud computing server is located can perform person condition information examination on any vehicle in an administrative area thereof, collect and store detection results and information, and perform corresponding warning and policemen dispatching actions through the cloud monitoring terminal.

The cloud monitoring terminal has the following functions: (1) after being authorized by the cloud computing server, connecting with a vehicle-mounted electronic terminal through a wide area wireless network, exchanging video, sound and control signals with the vehicle-mounted electronic terminal, and actively examining and collecting the person condition information of the vehicle-mounted electronic terminal; (2) receiving warning information of the vehicle-mounted electronic terminal; and (3) exchanging data information resources with the cloud computing server.

The cloud monitoring terminal can be classified into the following two types:

(1) Fixed type: this type of monitoring terminal is deployed at fixed sites such as a "traffic infrastructure" and a "security management infrastructure". Positions of these infrastructures ensure grassroot-oriented traffic management and security management, for example, traffic management and security management in parking lot, traffic toll gate, traffic flow indication plate, security police box, and community committee. These monitoring terminals are authorized by the cloud computing server, and are mainly responsible for collecting or forwarding information about the road condition, the vehicle condition, and the person condition, or exerting a supervision management function on traffic and security in the administrative area thereof.

(2) Mobile type: this type of monitoring terminal is deployed at a police vehicle and a police motorcycle in the public security system. Through these vehicle-mounted monitoring terminals, public security policemen can perform mobile on-site person condition information examination on automotive vehicles on the road and feed back the information to the cloud computing server in time.

A vehicle-mounted electronic terminal has a person condition detection unit, and relative to the cloud monitoring terminal, the vehicle-mounted electronic terminal is in a status of being examined and supervised. That is, when a certain cloud monitoring terminal actively sends a person condition examination request, the vehicle-mounted electronic terminals respond passively and accept the examination. Meanwhile, when the vehicle-mounted electronic terminal performs non-networking local person condition information detection, and finds a dangerous case, the vehicle-mounted electronic terminal can actively send a warning signal to the cloud monitoring terminal to ask for help.

The cloud computing platform is provided with functions of collecting, storing, computing, transmitting and managing data of the vehicle-mounted electronic terminal, and can provide good network access and safety guarantee capabilities, thereby effectively overcoming disadvantages of the vehicle-mounted electronic terminal such as small storage capacity and weak computing capability. The cloud computing platform can collect the video information of the vehicle driver through the vehicle-mounted electronic terminal, extract facial features, and perform computing through a fatigue driving algorithm, so as to judge whether the driver is in a fatigue driving state and determine the fatigue degree of the driver, to judge whether the driver is threatened and hijacked by a criminal, and to judge whether the vehicle is driven, burglarized or robbed by a criminal; according to the safety hazard information about person condition, vehicle condition and road condition which uploaded by vehicle-mounted electronic terminal, judging and learning, mechanism analysis and database updating, for example, updating the gradient information and the camber information; providing safety path warning, providing the safety hazard information about person condition, vehicle condition and road condition to vehicle-mounted electronic terminal on road in advance, or attaching a safety alert layer on the digital map online for the vehicle-mounted electronic terminal with navigation function on road.

For the cloud computing, each vehicle-mounted electronic terminal is a cloud computing terminal, and the server is the cloud computing platform. The vehicle-mounted electronic terminal accesses the cloud computing platform through the wireless network. Each vehicle-mounted electronic terminal has a unique ID number; the user name and the password are designated by the user at the first time of access, and are used for verification during subsequent login. When the vehicle-mounted electronic terminal is disconnected from the cloud computing platform and needs reconnection, accessibility verification needs to be performed, and procedure is as follows:

The vehicle-mounted electronic terminal sends the pre-designated personal login user name, password, and terminal ID to the cloud computing platform in the encoding form of "user name+password+ID". The cloud computing platform performs retrieval in the database, and establishes a network connection after determining that the user and the vehicle-mounted electronic terminal exist; otherwise, the access is denied.

The cloud computing platform opens an independent storage space for each vehicle-mounted electronic terminal, where vehicle information can be stored, and the vehicle information specifically includes: the user information of the vehicle-mounted electronic terminal, the device ID, the video files and pictures collected from the vehicle-mounted electronic terminal, the vehicle state and history information, the vehicle position, the fatigue driving warning information, the illegitimate driving warning information, and the alcohol test record collected by the vehicle-mounted electronic terminal through the CAN bus.

Figure 22:
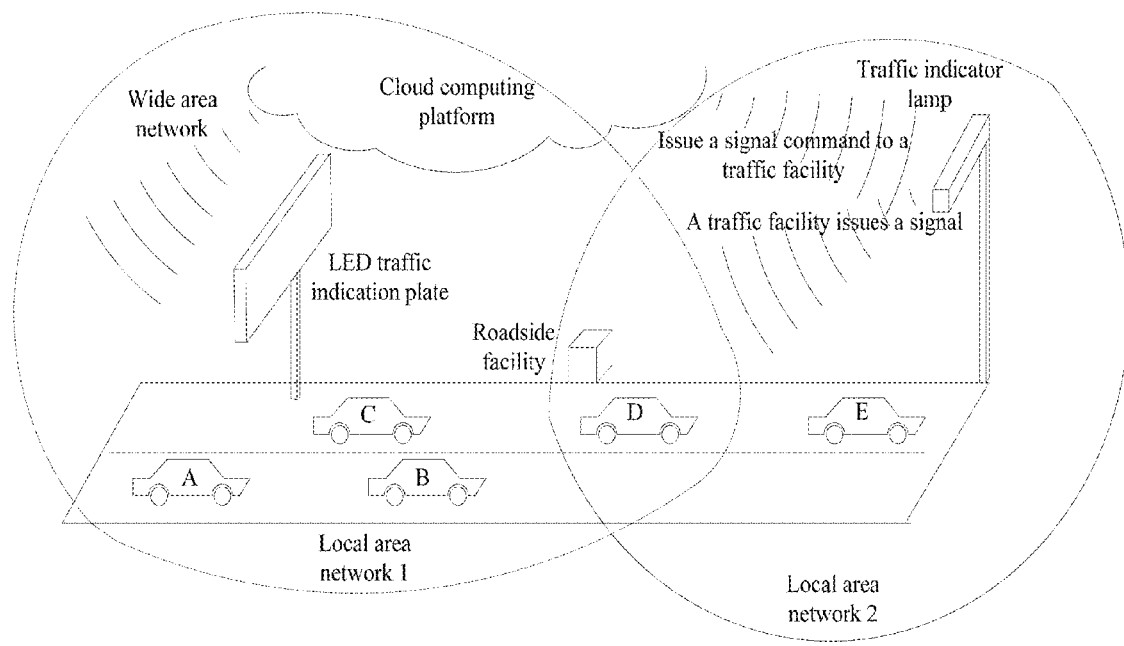
FIG. 22 is a schematic diagram of distribution of a wireless network in a certain section of a highway.

FIG. 22 is a schematic diagram of distribution of a wireless network in a certain section of a highway. The wireless network integrates a local area network and a wide area network, and a vehicle and traffic infrastructures around the vehicle form a wireless local area network. When many vehicles are running, each vehicle may exist in multiple local area networks simultaneously. The networking of the wireless local area network is adaptive.

In the present invention, the wireless local area network is constructed preferentially in the ZigBee manner. ZigBee is a technology for networking an internet of thinks, has the following characteristics:

(1) Extremely strong self-organizing capability and self-healing capability

Person intervention is not required, a network node can perceive other nodes, and form a network with the node. In an existing network, when one node is added or deleted, or the node position changes, the network heals automatically, and correspondingly adjusts the network topology structure, so that the network can still work normally.

(2) Flexible networking mode

A mesh type network, namely, multi-point to multi-point network can be formed. Any two devices in the network can exchange data.

(3) High network security level

The ZigBee network supports the AES128 encryption algorithm.

(4) Large network capacity

A ZigBee network can accommodate at most 254 slave devices and one master device, and at most more than 200 ZigBee networks can co-exist in the same region.

For further description about the ZigBee technology, visit the official website (www.ZigBee.org) for relevant technical documents, which are not described herein.

The function of the wireless local area network formed of vehicle-mounted electronic terminals mainly lies in reminding an adjacent vehicle of safety. A vehicle-mounted electronic terminal mounted on a certain vehicle sends a data packet indicating a condition of the vehicle through the wireless network, and after receiving the data packet, another vehicle-mounted electronic terminal mounted on a nearby vehicle takes necessary countermeasures according to content of the data packet. Specifically, when a vehicle incurs or finds an urgency situation or needs to perform a certain vehicle operation, in order to avoid affecting another vehicle, another vehicle needs to be informed of the state of the current vehicle or the operation to be performed by the current vehicle in advance. The vehicle-mounted electronic terminal on the vehicle sends data information to another vehicle. Or when it is detected that a driver in a vehicle is in a danger state of drunk driving, fatigue driving, or being hijacked, the vehicle-mounted electronic terminal also sends a signal to a vehicle nearby and the server, so as to give an alarm or ask for help. Because the number of vehicles is enormous on the road, each vehicle may exist in multiple local area networks simultaneously, and when a vehicle receives alarm information or information for help from a local area network, the vehicle transmits the information to vehicles in other local area networks.

The networking of the local area network is determined according to the relative position and the vehicle running direction computed based on the absolute position of the vehicle measured by a built-in navigation positioning module of the vehicle-mounted electronic terminal. The distance of the vehicle relative to an ambient vehicle can be indirectly obtained according to the measurement data of navigation positioning modules of multiple vehicle-mounted electronic terminals, thereby calculate the running direction. On a highway and a countryside road, local area network communication is established only between vehicles whose running directions are the same and whose inter-vehicle straight-line distance is within 300 meters. For traffic infrastructures, local area network communication is also established only when the distance to the vehicle is less than 300 meters. However, on a crowded city road, local area network communication is only established between vehicles whose traveling directions are the same and whose inter-vehicle straight-line distance is within 100 meters. For traffic infrastructures, local area network communication is also established only when the distance to the vehicle is less than 100 meters. Continuously developing virtual reality and augmented reality technologies are adopted to provide a personalized multimedia manipulation environment for anti-crash safety driving of the driver.

Each data packet sent from a vehicle-mounted electronic terminal on a vehicle is encoded according to different situations, the structure of "data header+terminal device ID+license plate number+states+verification bit+parking bit" can be adopted, and the states indicate five states, which specifically include: fatigue driving, drunk driving, hijacked, overtaking request, and parking request. The states are specifically indicated with a digit:

State 1: fatigue driving: 00 (not fatigue), 01 (slight fatigue), 10 (intermediate fatigue), and 11 (serious fatigue).

State 2: drunk driving: 00 (no drinking), and 01 (drinking).

State 3: hijacked: 00 (normal state, not hijacked), and 01 (hijacked by a gangster).

State 4: overtaking request: 00 (no request), 01 (left overtaking request), and 10 (right overtaking request).

State 5: parking request: 00 (no request), and 01 (parking request).

In this way, state 1 to state 5 are sequentially encoded, and different digits are used to indicate respective corresponding states. A vehicle-mounted electronic terminal on another vehicle can distinguish states of the current vehicle and the driver through the data packet, so as to take necessary countermeasures.

In cooperation with the navigation positioning module, a ZigBee network formed of different vehicles can obtain relative positions and relative speeds of the vehicles, and send caution information in the case of parking, overtaking, and circumambulating operations so as to avoid a crash. This intelligent traffic safety mode is hardly influenced by the weather and the landform, and can also normally work in an extreme weather condition such as fog, rain and snow.

The intelligent traffic safety system based on comprehensive state detection and the decision method thereof provided in the present invention are illustrated in detail above. Any apparent modification made to the present invention by persons of ordinary skill in the art without departing from the essential spirit of the present invention violates patent rights of the present invention, and the persons should bear corresponding legal liabilities.

What is claimed is:

1. An intelligent traffic safety decision method based on comprehensive state detection, which is to supply an alarm information for a driver in the process of driving, wherein Firstly an influence of a person condition is considered, when $t_{relative} > t_{dr}$, first alarm information is not triggered, otherwise the first alarm information is triggered, wherein $$t_{relative} = \frac{r_{relative}}{v_{relative}};$$

Secondly a vehicle condition is considered,
When $$a_{relative} = \frac{v_{relative}}{t_{relative}} = \frac{v_{relative}^2}{2r_{relative}} < a_{brake},$$

second alarm information is not triggered, otherwise the second alarm information is triggered, where
an influence of a road condition is further considered, the second alarm information is not triggered, when $$\frac{v_{relative}^2}{2r_{relative}} < k_{gradient} k_{crooked} a_{brake};$$

Where, $r_{relative}$ is a relative distance reference value between the front single-target barrier and the vehicle $v_{relative}$ is a relative speed reference value between the front single-target barrier and the vehicle, $t_{dr}$ is a time value to reflect the driver's capability, $a_{brake}$ is an acceleration value of braking, $k_{gradient}$ is a gradient influencing coefficient, and $k_{crooked}$ is a camber influencing coefficient.

2. The intelligent traffic safety decision method according to claim 1, wherein
the time value $t_{dr}$ is obtained through the following formula:

$$t_{dr} = t_{re}(1+k_{alcoholicity\_re})(1+k_{tiredness\_re}) + t_{ex}(1+k_{alcoholicity\_ex})(1+k_{tiredness\_ex})$$

Where, $t_{re}$ is a reaction capability of driver, $t_{ex}$ is a manipulation capability of driver, $k_{alcoholicity\_re}$ and $k_{alcoholicity\_ex}$ separately indicate influences of alcoholic strength on the reaction capability and the manipulation capability, $k_{tiredness\_re}$ and $k_{tiredness\_ex}$ separately indicate influences of fatigue degree on the reaction capability and the manipulation capability.

3. The intelligent traffic safety decision method according to claim 1, wherein
the acceleration value of braking $a_{brake}$ is obtained through the following formula:

$$a_{brake} = \frac{m_0}{m_0 + m_p} a_{brake,0}$$

where, $m_0$ is a vehicle no-load weight, $m_p$ is a load weight, $a_{brake,0}$ is an acceleration of the vehicle with no-load.

4. An intelligent traffic safety system based on comprehensive state detection, wherein
the intelligent traffic safety system comprises a person condition detection unit, a vehicle condition detection unit, a road condition detection unit, an intelligent decision unit, a driver warning unit, a current vehicle mandatory processing unit, a barrier warning unit, a pursuer warning unit and an after-crash warning unit, wherein,
the person condition detection unit further comprises three underlying detection modules for driver identity recognition and basic capability detection, driver's alcoholic strength monitoring, and driver's fatigue degree detection;
the road condition detection unit further comprises six underlying detection modules for road basic parameter detection, weather influencing factor detection, road busy degree detection, front barrier detection, rear pursuer detection, and opposite pursuer detection;
the person condition detection unit, the vehicle condition detection unit and the road condition detection unit are separately connected to the intelligent decision unit; according to person condition information, vehicle condition information and road condition information, the intelligent decision unit executes the intelligent traffic safety decision method according to claim 1, and separately sends corresponding crash avoidance warning and processing instructions to the driver warning unit, the current vehicle mandatory processing unit, the barrier warning unit, the pursuer warning unit and the after-crash warning unit, which connected to the intelligent decision unit.

5. The intelligent traffic safety system according to claim 4, wherein
the intelligent traffic safety system is formed of a server supporting cloud computing, multiple vehicle-mounted electronic terminals mounted on vehicles and a cloud monitoring terminal mounted on a traffic infrastructure, wherein,
the server and the cloud monitoring terminal form a cloud computing platform, to provide elementary computing and management functions for the entire intelligent traffic safety system, comprising safety information learning, safety path warning and digital map loading service; the cloud computing platform is connected to each vehicle-mounted electronic terminal through a wide area wireless network and/or cable network, and the vehicle-mounted electronic terminals are connected with each other through a wireless network;
the vehicle-mounted electronic terminals mounted on the vehicles are used for identifying information about person conditions comprising whether a driver is a legitimate driver, driver's fatigue state, driver's under-threat state, and driver's drinking state.

6. The intelligent traffic safety system according to claim 5, wherein
a wireless network between the vehicle-mounted electronic terminals is constructed with ZigBee technology.

7. The intelligent traffic safety system according to claim 5, wherein
a vehicle-mounted electronic terminal mounted on a certain vehicle sends a data packet indicating a condition of the vehicle through the wireless network, and after receiving the data packet, a vehicle-mounted electronic terminal mounted on a nearby vehicle takes countermeasures according to content of the data packet.

8. The intelligent traffic safety system according to claim 5, wherein
the driver identity recognition and basic capability detection module is implemented through the vehicle anti-theft and anti-robbery network apparatus, comprises a pyroelectric sensor, a pan/tilt head, a camera, a front-end embedded system and a front-end detection module, wherein, the front-end embedded system comprises a front-end embedded central unit, a pyroelectric interface circuit, a pan/tilt head control circuit and a video input processing interface; the front-end embedded central unit is separately connected to the pyroelectric interface circuit, the pan/tilt head control circuit and the video input processing interface, and is connected to the front-end detection module which used for executing a pattern recognition method for recognizing driver identity information;

the pyroelectric sensor, the pan/tilt head and the camera are mounted on a frame of a vehicle front windshield outside a driver, and are respectively connected to the pyroelectric interface circuit, the pan/tilt head control circuit and the video input processing interface.

9. The intelligent traffic safety system according to claim 8, wherein the front-end detection module further comprises a face detection module, a face feature point positioning module, a liveness identification module, a face recognition module and an anti-robbery function module.

10. The intelligent traffic safety system according to claim 5, wherein the driver fatigue degree detection module is implemented through the driver fatigue monitoring electronic terminal, comprises a camera, a pan/tilt head, a front-end embedded module and a front-end application module, wherein, the camera and the pan/tilt head are separately connected to the front-end embedded module, the front-end embedded module is connected to the front-end application module, and the front-end application module is used for executing detection on an eye opening/closing state, a yawning state, and a head movement state, and making comprehensive judgment;

the camera is mounted on the pan/tilt head, and the pan/tilt head is mounted on a frame of a vehicle front windshield outside a driver.

11. The intelligent traffic safety system according to claim 10, wherein the front-end embedded module comprises a front-end embedded central unit, a video interface and analog-to-digital conversion circuit and a pan/tilt head control circuit; the front-end embedded central unit is separately connected to the video interface and analog-to-digital conversion circuit and the pan/tilt head control circuit;

the video interface and analog-to-digital conversion circuit is connected to the camera, and the pan/tilt head control circuit is connected to the pan/tilt head.

12. The intelligent traffic safety system according to claim 10, wherein the front-end application module further comprises a face detection module, a face feature point positioning module, an eye opening/closing detection module, a yawning detection module, a head movement tracking module and a comprehensive judgment module, wherein, the face detection module and the face feature point positioning module are connected, and are separately connected to the eye opening/closing detection module, the yawning detection module and the head movement tracking module; the eye opening/closing detection module, the yawning detection module and the head movement tracking module are separately connected to the comprehensive judgment module.

13. The intelligent traffic safety system according to claim 5, wherein the driver alcoholic strength detection module comprises a driver inductor, a visible blowpipe, an acousto-optic generator, an on-site embedded server and at least one remote wireless monitoring terminal;

the driver inductor, the visible blowpipe and the acousto-optic generator are separately connected to the on-site embedded server; the on-site embedded server and the remote wireless monitoring terminal perform remote wireless communication;

the driver inductor is mounted under a driver's seat in a vehicle.

14. The intelligent traffic safety system according to claim 5, wherein the front barrier detection module, the rear pursuer detection module, and the opposite pursuer detection module are implemented through a vehicle active anti-crash apparatus, and the microwave radar in the vehicle active anti-crash apparatus is mounted over the whole body of a vehicle, the microwave radar comprises a transmitting/receiving front end and a signal processing rear end; the transmitting/receiving front end and the signal processing rear end are connected with each other through a power line, a control line, an analog modulation signal line and an echo signal line; the signal processing rear end accesses a vehicle bus, and is then connected to a transmission system and a braking system of the vehicle, so as to control a movement state of the vehicle.

15. The intelligent traffic safety system according to claim 5, wherein the vehicle condition detection unit comprises a redundancy reliability monitoring apparatus for an internal working condition of a vehicle tire, the redundancy reliability monitoring apparatus comprises a vehicle upper module and multiple tire lower modules, wherein, the vehicle upper module is mounted inside a vehicle, and is formed of a reliable starting unit, a multi-channel warning unit and an emergency processing unit; the tire lower module is mounted inside each vehicle tire, and is formed of a redundancy measurement unit and an on-site processing unit;

multiple sensors used for implementing pressure measurement, temperature measurement, humidity measurement, electricity measurement and movement induction inside the vehicle tire is disposed in the redundancy measurement unit, and the sensors adopts a redundancy configuration manner;

the tire lower module and the vehicle upper module communicate with each other in a wireless manner.

16. The intelligent traffic safety system according to claim 15, wherein the redundancy configuration manner means to set one primary sensor and at least one backup sensor for the same measurement objective, and each sensor separately sends a measurement signal independently.

17. A pre-estimation method for computing a camber/gradient of a front road, used in the intelligent traffic safety decision method according to claim 1 to determine the camber/gradient influencing coefficient, comprising the following steps:

first, establishing a two-dimensional dynamic azimuth coordinate system with a current position of a running vehicle as an origin, and searching for conditions of the origin and ambient roads;

secondly, determining an arc length interval according to a length of the vehicle and a road jam degree, selecting multiple points according to a predetermined time interval between two adjacent points in the front and back of the road, obtaining a coordinate value of each point in the two-dimensional dynamic azimuth coordinate system according to a geographic parameter of each point, and recording the values as a column vector;

thirdly, performing fitting based on the known column vector to obtain the following three-dimensional polynomial, and a first-order derived function and a second-order derived function thereof:

$$y=a_0+a_1x+a_2x^2+a_3x^3, \dot{y}=a_1+2a_2x+3a_3x^2, \ddot{y}=2a_2+6a_3x$$

a curvature radius is expressed as follows:

$$R = \frac{(1+\dot{y}^2)^{3/2}}{\ddot{y}}$$

and a direction angle is expressed as follows:

$$\psi = \begin{cases} \arctan(\dot{y}) & \text{if } x \geq 0 \\ \arctan(\dot{y})+\pi & \text{if } x < 0, y \geq 0 \\ \arctan(\dot{y})-\pi & \text{if } x < 0, y < 0. \end{cases}$$

finally, computing a geographic parameter change quantity of each point relative to a previous point, and pre-estimating a camber/gradient of a front road according to the geographic parameter change quantity.

18. The pre-estimation method for computing a camber/gradient of a front road according to claim 17, wherein
when the camber of the front road needs to be pre-estimated, the geographic parameter is a longitude/latitude parameter.

19. The pre-estimation method for computing a camber/gradient of a front road according to claim 17, wherein
when the gradient of the front road needs to be pre-estimated, the geographic parameter is an altitude parameter.

* * * * *